（12）United States Patent
Richiger

(10) Patent No.: US 11,793,117 B2
(45) Date of Patent: Oct. 24, 2023

(54) SELF-TRAILERING GRAIN BAGGING MACHINE ON FOUR WHEELS

(71) Applicant: Gabriel Alberto Richiger, Province of Santa Fé (AR)

(72) Inventor: Gabriel Alberto Richiger, Province of Santa Fé (AR)

( * ) Notice: Subject to any disclaimer, the term of this patent is extended or adjusted under 35 U.S.C. 154(b) by 336 days.

(21) Appl. No.: 17/371,420

(22) Filed: Jul. 9, 2021

(65) Prior Publication Data

US 2022/0151158 A1 May 19, 2022

(30) Foreign Application Priority Data

Nov. 13, 2020 (AR) .............................. P20200103142

(51) Int. Cl.
*A01F 25/14* (2006.01)
*B62D 63/08* (2006.01)
*B66C 23/36* (2006.01)
*B60S 9/10* (2006.01)
*B66C 23/00* (2006.01)

(52) U.S. Cl.
CPC .............. *A01F 25/14* (2013.01); *B62D 63/08* (2013.01); *B66C 23/36* (2013.01); *A01F 2025/145* (2013.01); *B60S 9/10* (2013.01); *B66C 23/54* (2013.01)

(58) Field of Classification Search
CPC ................................................ A01F 2025/145
USPC ....................................................... 141/313
See application file for complete search history.

(56) References Cited

U.S. PATENT DOCUMENTS

| | | | | | |
|---|---|---|---|---|---|
| 4,174,813 | A | * | 11/1979 | Grataloup | A01C 15/04 239/655 |
| 4,337,805 | A | * | 7/1982 | Johnson | A01F 25/183 100/65 |
| 4,484,606 | A | * | 11/1984 | Kosters | B65B 1/12 198/663 |
| RE31,810 | E | * | 1/1985 | Lee | A01F 25/18 100/177 |
| 4,526,265 | A | * | 7/1985 | Enns | B65G 41/002 198/318 |
| 4,567,820 | A | * | 2/1986 | Munsell | A01F 25/14 100/189 |
| 4,672,794 | A | * | 6/1987 | Good | A01F 25/14 100/189 |

(Continued)

*Primary Examiner* — Joseph A Dillon, Jr.
(74) *Attorney, Agent, or Firm* — The Morales Law Firm; Joseph L. Morales

(57) ABSTRACT

A self-trailering grain bagging machine on four wheels for storing grains and seeds inside a silo bag. The machine has a grain receiving hopper within which a compression auger encased in an auger tube. The auger is driven by mechanical means powered from a tractor's power take-off. The machine is mounted on a frame fitted with paired crossmembers at its left and right hand sides. Each crossmember is mounted upon a pair of wheel supports. The wheel supports are capable of gyrating relative to the crossmembers. The wheel supports carry one wheel that wheel rotates along with said wheel support. A work tongue is attached to the front side of the frame. The work tongue pivots relative to a horizontal axis. A transport tongue is attached to one crossmember wherein the wheels remain aligned in the direction intended for work and when turning said wheel supports by 90 degrees.

22 Claims, 14 Drawing Sheets

(56) References Cited

U.S. PATENT DOCUMENTS

| | | | | |
|---|---|---|---|---|
| 4,735,242 A * | 4/1988 | St. Clair | A01F 25/183 | 141/10 |
| 4,747,343 A * | 5/1988 | St. Clair | B30B 9/3089 | 100/65 |
| 4,819,701 A * | 4/1989 | Thornton | B65B 1/04 | 141/231 |
| 4,949,633 A * | 8/1990 | Johnson | A01F 25/14 | 100/65 |
| 5,159,877 A * | 11/1992 | Inman | A01F 25/14 | 100/177 |
| 5,213,143 A * | 5/1993 | Policky | A01F 25/14 | 141/10 |
| 5,295,554 A * | 3/1994 | Cullen | A01F 25/14 | 180/236 |
| 5,297,377 A * | 3/1994 | Cullen | A01F 25/14 | 53/529 |
| 5,313,768 A * | 5/1994 | Cullen | A01F 25/14 | 53/259 |
| 5,396,753 A * | 3/1995 | Cullen | A01F 25/14 | 141/73 |
| 5,408,810 A * | 4/1995 | Cullen | A01F 25/14 | 53/529 |
| 5,413,155 A * | 5/1995 | Ryan | A01F 25/14 | 100/65 |
| 5,419,102 A * | 5/1995 | Inman | A01F 25/14 | 53/567 |
| 5,517,806 A * | 5/1996 | Cullen | A01F 25/14 | 53/529 |
| 5,566,532 A * | 10/1996 | Inman | A01F 25/14 | 53/529 |
| 5,775,069 A * | 7/1998 | Cullen | A01F 25/14 | 53/529 |
| 6,112,956 A * | 9/2000 | Malone | B65B 1/42 | 222/161 |
| 6,202,389 B1 * | 3/2001 | Inman | A01F 25/14 | 53/436 |
| 6,443,194 B1 * | 9/2002 | Cullen | A01F 25/14 | 141/73 |
| 6,655,116 B2 * | 12/2003 | Cullen | A01F 25/14 | 53/527 |
| 7,934,360 B2 * | 5/2011 | Cullen | A01F 25/183 | 141/73 |
| 8,376,386 B2 * | 2/2013 | Hilsabeck | B60D 1/07 | 280/406.1 |
| 2005/0241278 A1 * | 11/2005 | Hulshof | A01F 25/183 | 53/576 |
| 2010/0037569 A1 * | 2/2010 | Martinez | A01F 25/14 | 53/564 |
| 2011/0162328 A1 * | 7/2011 | Cullen | A01D 87/02 | 53/459 |
| 2011/0272062 A1 * | 11/2011 | Bartolome Gaviglio | A01F 25/14 | 141/114 |
| 2012/0240530 A1 * | 9/2012 | Martinez | A01F 25/14 | 53/567 |
| 2014/0230961 A1 * | 8/2014 | Hadad | B65B 1/04 | 141/114 |
| 2016/0039545 A1 * | 2/2016 | Stumpe | B65B 39/08 | 141/250 |
| 2020/0262325 A1 * | 8/2020 | Karg | A01D 61/04 | |

* cited by examiner

SELF-TRAILERING GRAIN BAGGING MACHINE ON FOUR WHEELS

BACKGROUND

Prior Art

Whole Grain Bagging Machines

The present specification refers to grain bagging machines, or more specifically to whole grain baggers. Throughout the disclosure they will often be referred to simply as baggers. These are employed to store different kinds of grains and seeds in large, elongated plastic bags for short to long term preservation. These are usually called silo bags or bags in a shortened form and usually consist of three layers of high density polyethylene that provide great elasticity and resistance.

Whole grain baggers can store other types of organic or inorganic materials, as for instance dry sand, the requisite condition being that these materials can run more or less freely, i.e. that they can flow to a certain degree.

Baggers typically range from 6 ft to 12 ft models, meaning that depending on the model they can fill bags that go from 6 ft (approx. 1.80 m) to 12 ft (approx. 3.60 m) in diameter, with lengths that usually vary between 200 ft (approx. 60 m) and 500 ft (approx. 150 m).

The expression "self-trailering" applies to machines that have a certain configuration for work and then convert to a new configuration for towing along roads. It also implies that the machine will use the same intrinsic elements—especially the wheels—it already possesses in its work modality, that the conversion to transport mode is relatively simple to carry out, and that once the machine has thus been converted it will meet adequate standards of stability, speed and safety for travel on public roads, similar to what can be expected if the machine is loaded on a trailer or flatbed bogie.

As is known, all grain baggers work on the principle of a compression auger that forces grain into the bag. Virtually no grain baggers in the market today are self propelled but are powered by agricultural tractors that provide mechanical power to a bagger's compression auger. If required by more technically complex baggers, tractors can also supply hydraulic and electrical power. It should be noted that the travel of a bagger on the ground during work is not achieved through wheel drive but is a consequence of the compression auger forcing material into the bag, as will be detailed shortly in this description. Since their inception in the market on a massive scale since about two decades ago, grain baggers have been machines with two wheels or two points of contact with the ground plus a third point of support provided by the tractor's drawbar.

Some machines on the market, such as those of the Loftness brand in the US, are equipped with four wheels but only two wheels are in use at any given moment. A first array of two wheels is used conventionally during work, while a second array of two wheels is lowered hydraulically to raise the bagger off the ground, thus gaining clearance for transport by road.

Some baggers do not have any special system for towing on roads and must be transported on trailers, or are outfitted with simple systems as will be described shortly in a prior art machine.

Finally, self propelled whole grain baggers have been manufactured almost on an experimental basis and often by producers themselves, with low powered engines fitted on the bagger tongue to power the compression auger. These types of baggers have an additional wheel mounted on the tongue to provide the third support point that takes the place of the tractor's drawbar.

We will make a distinction between the kind of machines depicted previously, that is whole grain baggers, and other kinds of baggers that differ from these.

Processed Grain Bagging Machines

There is a subset of grain bagging machines that process grain before introducing it in the silo bag. This they do by grinding or crushing the grain with either a roller mill or a hammer mill mounted on the machine frame in one first stage, to then introduce the crushed material in the bag in a second stage. Thus they can be denominated as two-stage grain baggers. This crushed material can be either dry grain that does not change during permanency in the bag, or it can be moist grain that ferments inside the bag in just a few weeks to become highly digestible cattle feed.

Some of these two-stage grain baggers have four wheels, but these differ in their arrangement and purpose from the four-wheeled design proposed in the present specification. When this type of machine is equipped with four wheels, it consists of a bogie type arrangement, the wheels mounted on parallel axes, these axes a short distance from each other and jointed to swivel up and down. The wheels always point in a forward direction and do not turn, so there is no distinction between a work and a transport position for the wheels. The grinding mills add heavily to the total weight of two-stage grain baggers, so more wheels mean less pressure on the ground and provide better flotation on difficult terrain. A large proportion of their mass rests on the tractor's drawbar, so these two-stage grain baggers are fitted with heavy-set weight-bearing tongues that do not pivot.

Silage or Chopped Green Forage Bagging Machines

In contrast to grain baggers, silage baggers use a fundamentally different method to pack material inside a bag since they deal with irregular shaped particles and fibrous materials that do not flow. The products these machines store are previously chopped green crops (known as green forage) such as corn and sorghum that end up as whole plant silage once the material undergoes anaerobic fermentation within the silo bag.

Green forage particles have a high friction coefficient that results in poor material flow. Thus the working principle of the grain bagger, that is the compression auger, cannot be utilized in silage baggers. Instead, a multi-toothed packing rotor forces the material through a slotted plate that impedes its backflow, thus effectively compressing it inside the bag.

Because of its flow characteristics, these highly specialized machines possess a wide conveyor fitted with a transporting belt onto which the green forage is deposited by means of a dump truck or trailer, different from grain baggers that are fed by grain carts.

This is a system that needs considerably more power than that required by an auger for bagging similar volumes of grain. The power factor is inherent in producing economically viable silage in bags since high volumes of chopped forage need to be bagged in a short span of time in order to compete with traditional ensiling methods that rely on tractors' weight compressing the chopped material by riding over it. This has led to silage baggers being self-powered hefty machines with large on-board engines typically ranging from 300 HP on up to 700 HP, with fully functional cabins for one or more operators, with heavily built transmission drives, with large hydraulically operated conveyors for dump wagons or trucks to unload tons of material at a time, with spools loaded with hundreds of feet of wire to hydraulically control packing density of material inside the bag.

Self-powered silage baggers are set on four wheels because of design constraints and intrinsic features. These machines are fundamentally different from the relatively lightweight grain baggers that maintain horizontal balance propped by the tractor's drawbar, and thus possess four points of contact with the ground for steadiness and stability in the manner of any large size motor-powered vehicle.

Possibly the first grants for auger type baggers, i.e. baggers suited for handling grain, was U.S. Pat. No. 4,484,606 awarded to Larry J. Kosters on Nov. 27, 1984 and assigned to Roto Press Limited for a bagger with a large, centrally located auger conveyor connected to a funnel or tunnel chamber to which the bag is attached. This bagger was designed for different materials such as dry and moist grains. The disclosure makes numerous references to as to how the device force-feeds material into the tunnel and thereafter into the bag, e.g., "The device forces the ensilage or other material into the bag . . . " or " . . . forces material substantially . . . " or "The forcing mechanism moves material in the hopper through the connecting mechanism . . . ."

This patent filing marks the beginning of the grain bagging era. At the time it was thought that an auger could push green forage as well, an idea that was eventually abandoned as impractical because compression of the material proved to be insufficient and incomplete at best.

Another patent, U.S. Pat. No. 4,567,820 awarded to Frank E. Munsell on Feb. 4, 1986, shows a conceptually similar bagger with improvements in the feed auger supporting means through the use of bearings located outside of the material flow path, and a prolongation of the auger frontwards so that its forward end projects inside the accumulated material to eliminate or diminish the possibility of material becoming jammed.

U.S. Pat. No. 4,735,242 awarded to Rodney D. St. Clair on Apr. 5, 1987, introduces concepts such as the cradle on which the bag is mounted (here called a bag supporting framework) and the winch that permits its descent to the ground, the winch riding along a support rail that allows the positioning and installment of the bag over the bagger tunnel.

These early examples of bagging machines depict elements common in present day machines. Their basic mechanisms and working principles are similar to machines in the market today.

BRIEF SUMMARY OF THE INVENTION

An improved four wheel arrangement for grain baggers that offers better stability parameters for work and transport, ease of switching from work to transport and vice versa, that provides the option of using a smaller powered tractor for work and a lighter vehicle for towing, that simplifies the task of mounting the silo bag on the grain bagger tunnel, and that forestalls physical risks to operators that originate from front-heavy or rear-heavy traditional grain baggers supported by two wheels. This safety factor is further augmented by the bag tray becoming completely separate from the machine frame upon mounting the silo bag. Accordingly, several advantages are proffered in the present specification.

Advantages of the Present Disclosure Over Prior Art

1) The four-wheel arrangement for a grain bagger differs substantially from prior art grain baggers equipped with two wheels. It provides even weight distribution and less soil compaction. Four wheels firmly standing on the ground confer automatic leveling during work, whilst prior art baggers require height adjustment of their tongues.
2) Prior art grain baggers have fixed type tongues for work and for transport, placing bagger weight on the operating tractor's drawbar or on the transporting vehicle's hitch as the case might be. This may place undue weight on tractor or vehicle. The grain bagger of the present specification has a pull type tongue that does not place grain bagger weight on tractor or transporting vehicle. This allows labors and towing to be done with lighter, less powerful units.
3) The present specification does not require the operator to manually remove tires and manually re-position them on the machine when switching between transport and working modes.
4) A primary object of bagging is to compress the grain as much as possible inside the bag to expel the greatest amount of air and prolong product conservation. Compaction is directly proportional to braking power. Braking efficiency is put to the test in difficult terrain conditions. Presented here are three examples of real world situations:

EXAMPLE A

When bagging over muddy ground, wheels will lock easily with even slight braking force applied and slide on slippery ground without turning at all, thereby causing loss of control over packing pressure. Four wheels have a better grip on the ground than two wheels and there is less probability of them locking and sliding on mud, even with less pressure applied to the brake calipers. Besides, since the braking power of each wheel can be controlled individually, performance can be optimized by for instance applying less braking force to the two leading wheels and more force to the two trailing wheels, or by trying another combination that works.

EXAMPLE B

When bagging on a slope, tractor and bagger may not be able to operate transversally across it and be restricted to running either up or down the gradient. If running upward, the weight of the machines will normally help to compact the material, but if slope angle is excessive it can produce too much compaction in the bag even without applying brakes. In such circumstances and being forced to run downward, the situation is reversed and very efficient braking action will be required to compact the material adequately, in which case four wheels will perform better than two.

EXAMPLE C

Even when bagging under normal conditions over firm terrain, braking power distributed among more brakes can optimize labors. Sometimes the bagger brakes are set to apply high pressure on the discs in order to pack the grain more firmly, causing the brakes to seize up when brake calipers press so hard against the brake discs that these don't turn. This often results in short lapses in which the wheels do not rotate and tractor and bagger do not advance while the bag continues to expand as the compression screw keeps pushing grain in. As pressure mounts inside the bag, the pent-up energy abruptly overcomes brake resistance and then the tractor/bagger combo jumps forward, whereupon the cycle iterates. These intermittent cycles create humps on the bag's top section that reflect spots of higher and lower compaction. In a worst case scenario, if brakes remain stuck the incoming grain can very rapidly cause bag rupture and material loss. In the present disclosure this unwanted effect is better corrected because even if less brake pressure is exerted on each individual wheel, overall braking effectiveness is augmented due to the aggregate action of four wheels in comparison with the two wheels of conventional baggers.

5) There are safety issues involved when jacks are used to prop up heavy machines that are not in stable equilibrium in and of themselves. Prior art baggers are in this machine category. At several stages when setting up these machines, when attaching and detaching them from tractors, when ending labors with them, laborers support these baggers with adjustable screw jacks and fixed jack stands. If the bagger is not hitched to a tractor's drawbar acting as support, should a screw jack or jack stand fail or slip out of place, the machine can fall heavily and endanger those around it. In contrast, four wheels on the ground confer static and dynamic stability to the machine presently being described.

6) Prior art baggers are often hauled short distances along rural roads, but for longer trips on national roads the machines are loaded on trailers because speeds are higher than allowed by their standard transport configurations. With reference to the present disclosure, the bagger's self-trailering configuration allows it to omit this step. The self-trailering design permits higher towing speeds on roads, especially if the machine's brake circuits are connected to the tow vehicle's braking system. The bagger can also be fitted with bumpers and lights to travel by road.

7) The advantage of having four wheels is not related with the bagging machine's size or the size of bags the machine can handle. The largest silo bags presently available are 12 ft in diameter and that has been so for a long time. It is widely believed that silo bags that store grain will not become larger as this is the size limit that can be handled efficiently. Larger sizes are impractical, and if desired to boost storage capacity it is better to add to the number of bags utilized than to make them larger. The fact is that prior art grain baggers, including 12 ft baggers, use no more than two wheels. In some possible but unknown occurrence they might employ an equivalent: dual wheels at each side of the machine, i.e. four wheels in total but the layout still consistent with two unstable points of contact with the ground, with the tractor drawbar providing the third point of support.

8) The capability of unhooking or moving the bag tray away from the machine frame will significantly facilitate the mounting of bags on baggers. In the case of larger machines that use 12 ft diameter bags, these get to weigh about 400 kilos (approximately 880 lbs). They are also tricky to handle because the plastic folds are slippery, can easily fall into disarray and then rearranging them is complicated. Normally the operators must crouch or squat uncomfortably under the machine to install the heavy bag on a slanting bag tray. The proposed system allows the operators to remove a couple of easily accessible pins in order to unhook the tray. The tray is held up by the hoist crane, which leaves it on the ground. The operator can then place the bag upon the tray that rests in horizontal position, and do so without being partially obstructed by the bagger frame itself.

SHORT DESCRIPTION OF THE FIGURES

To exemplify advantages of the machines described here, in referral to which users and experts in the field could enlarge upon, and to facilitate comprehension of constituent, constructive and functional aspects of the present specification, a favored embodiment is illustrated schematically with no particular attention to size or scale. It should be noted that since the enclosed drawings are presented as examples, no limiting or exclusive characteristics should be associated with them as they are only meant to relay the basic concepts described in the present specification.

In Prior Art

In the Present Disclosure

Figure 5:
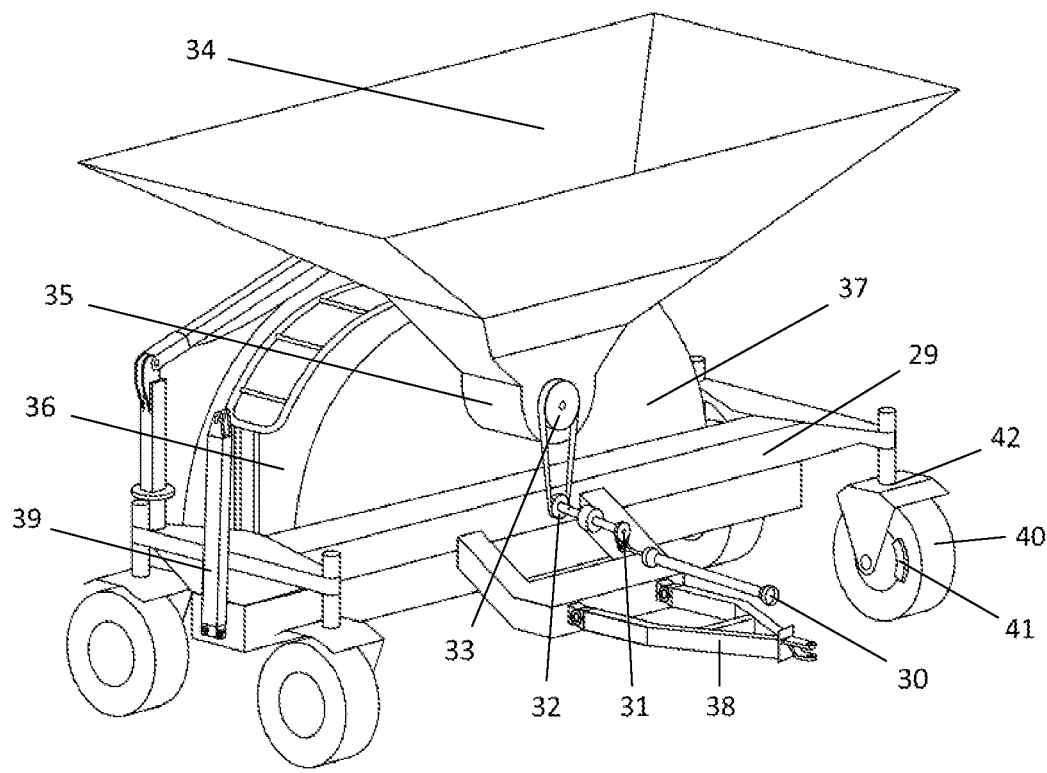

FIG. 5 is a perspective front and right side view of the whole grain bagger in work position.

Figure 6:
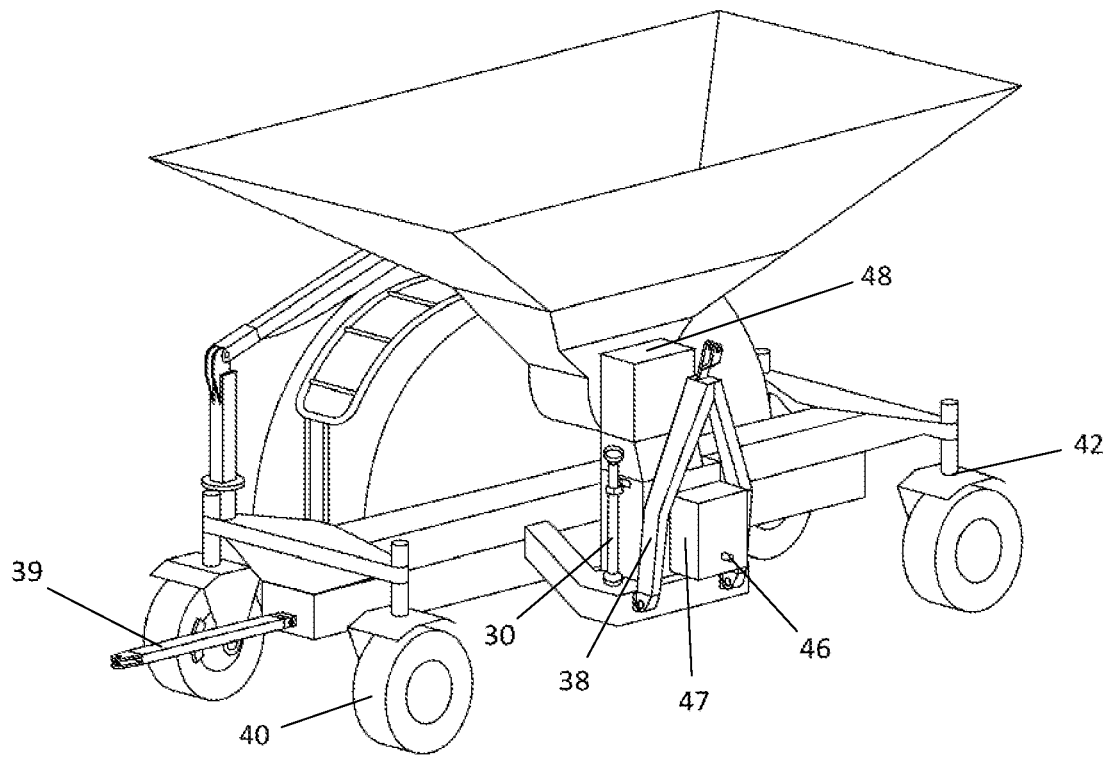

FIG. 6 is a perspective front and right side view of the whole grain bagger in transport position.

Figure 7:
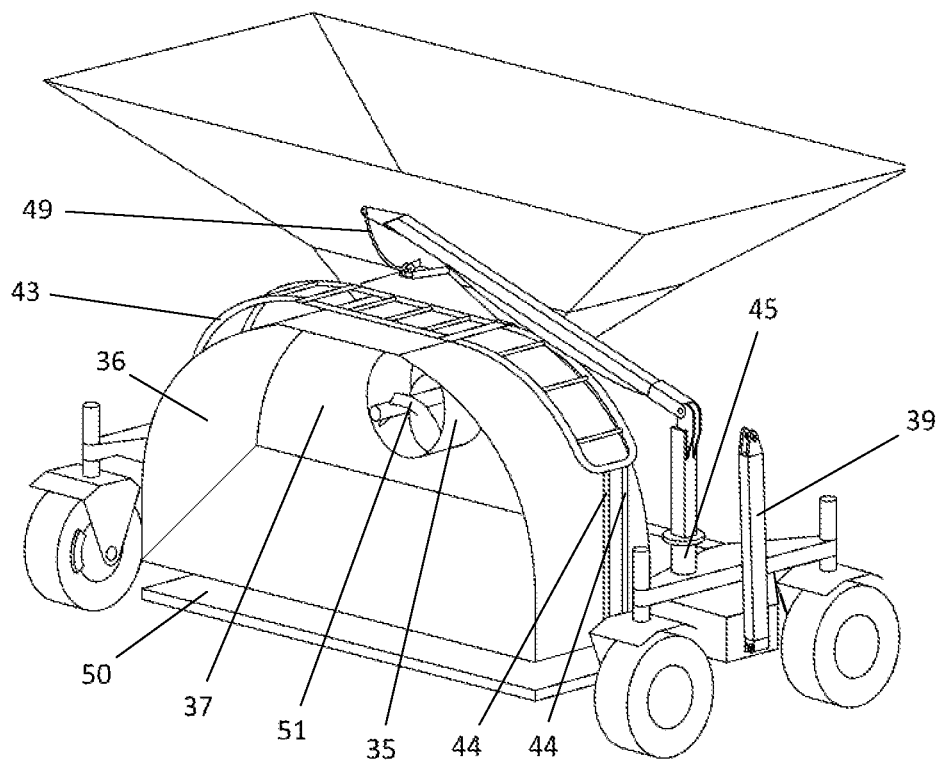

FIG. 7 is a perspective rear and right side view of the whole grain bagger in work position.

Figure 8:
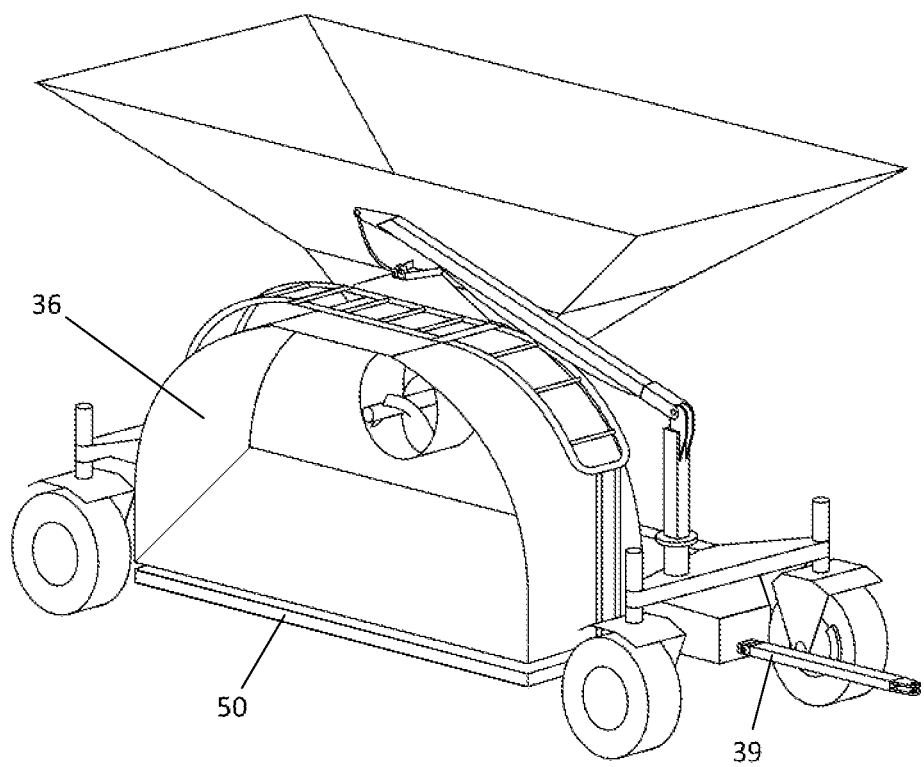

FIG. 8 is a perspective rear and right side view of the whole grain bagger in transport position.

Figure 9:
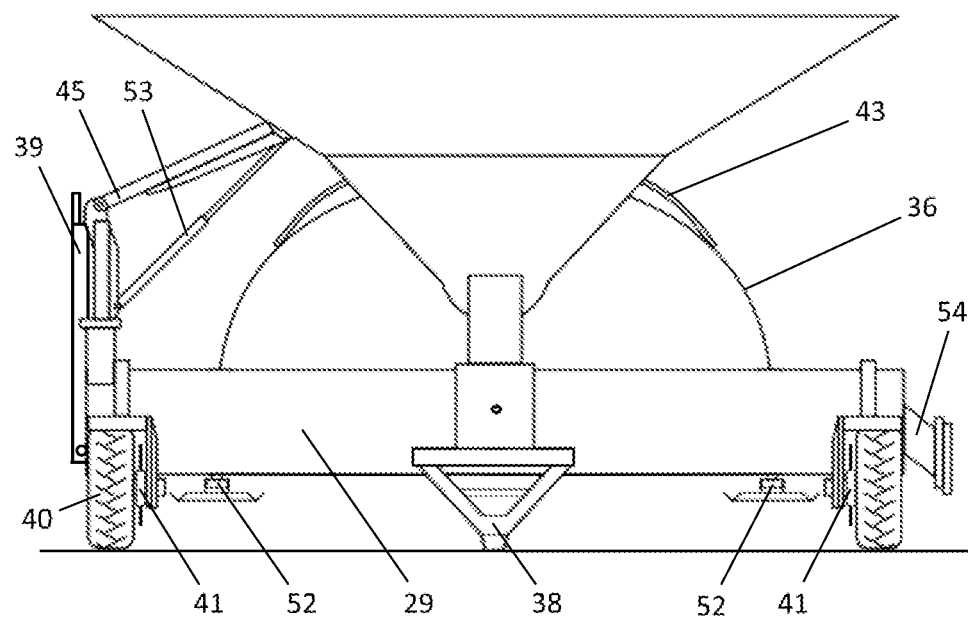

FIG. 9 is a schematic front view of the whole grain bagger with its hydraulic foot supports in retracted position.

Figure 10:
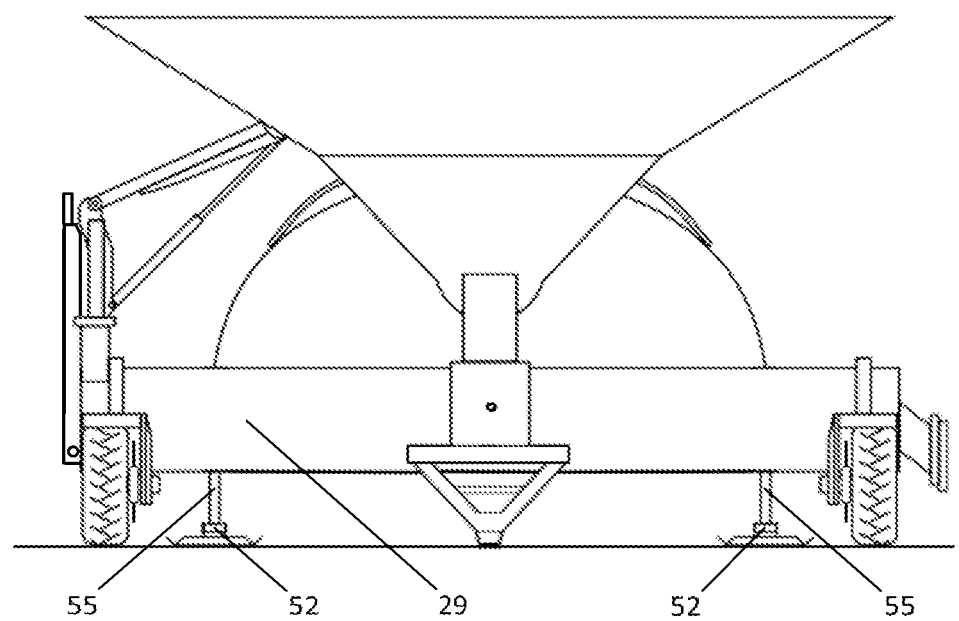

FIG. 10 is a schematic front view of the whole grain bagger with its hydraulic foot supports in extended position.

Figure 11:
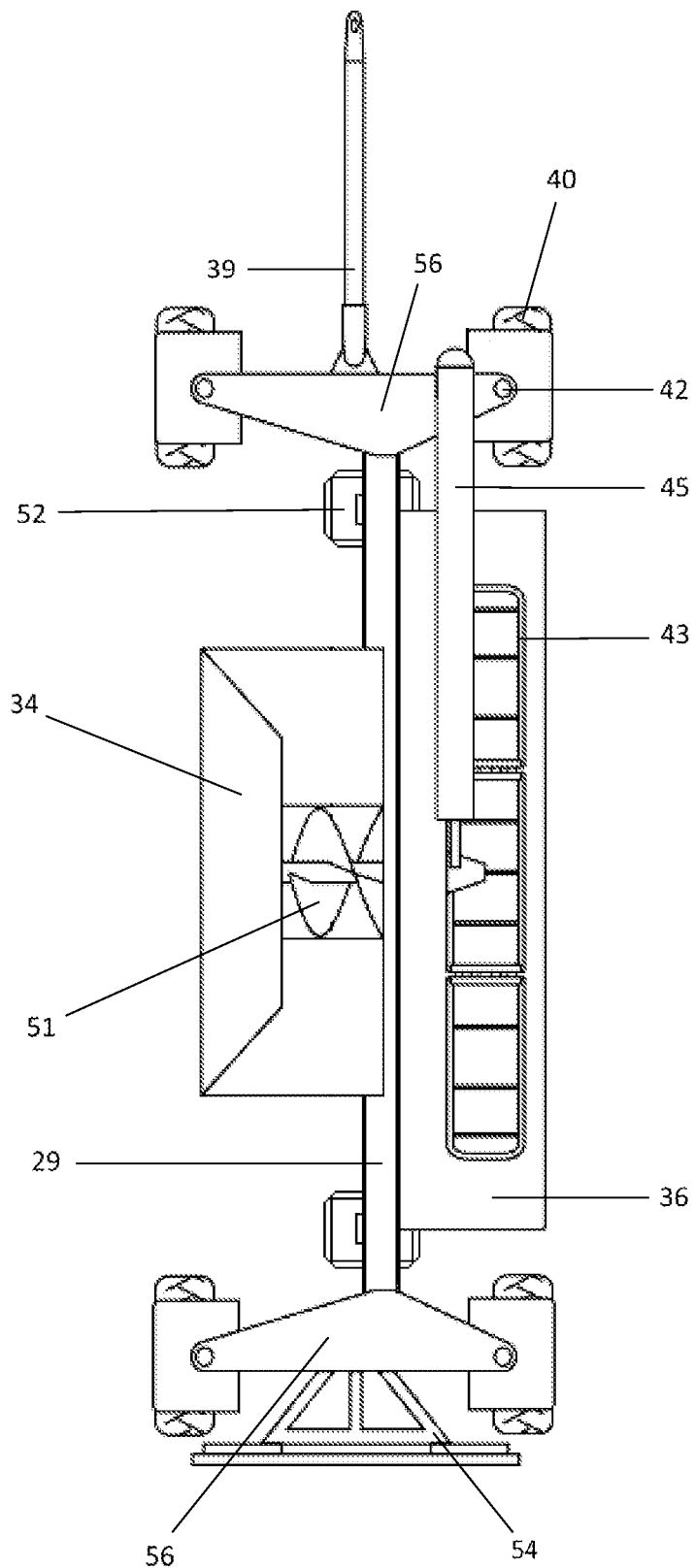

FIG. 11 is a schematic top side view of the whole grain bagger in transport position.

Figure 12:
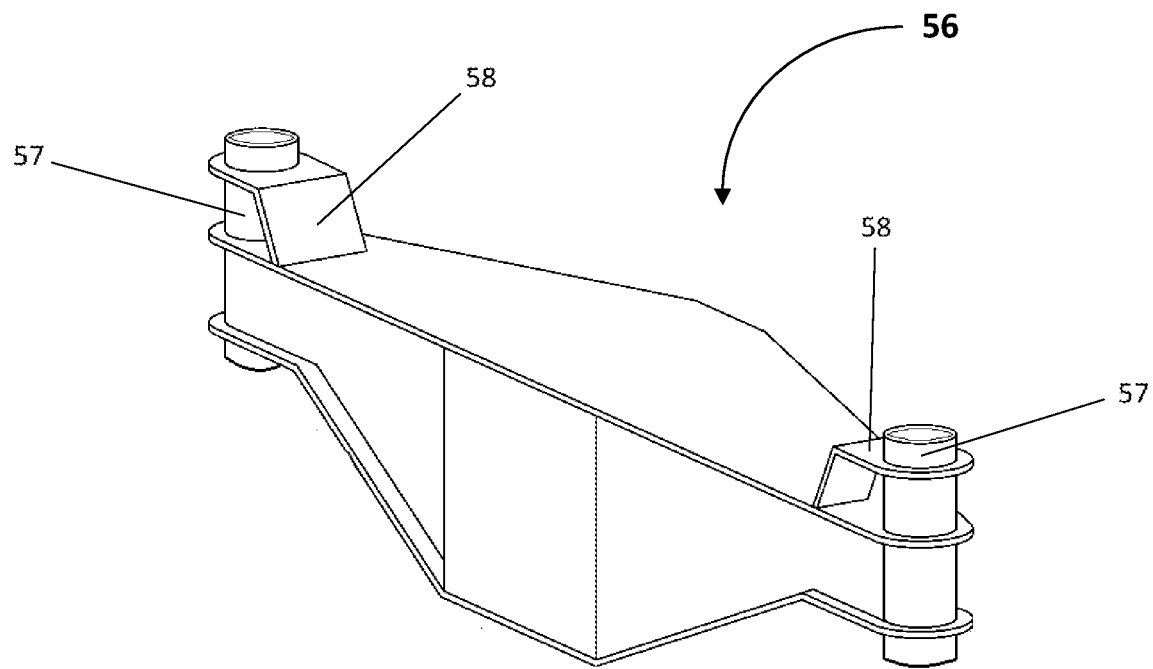

FIG. 12 is a perspective view of a frame crossmember.

Figure 13:
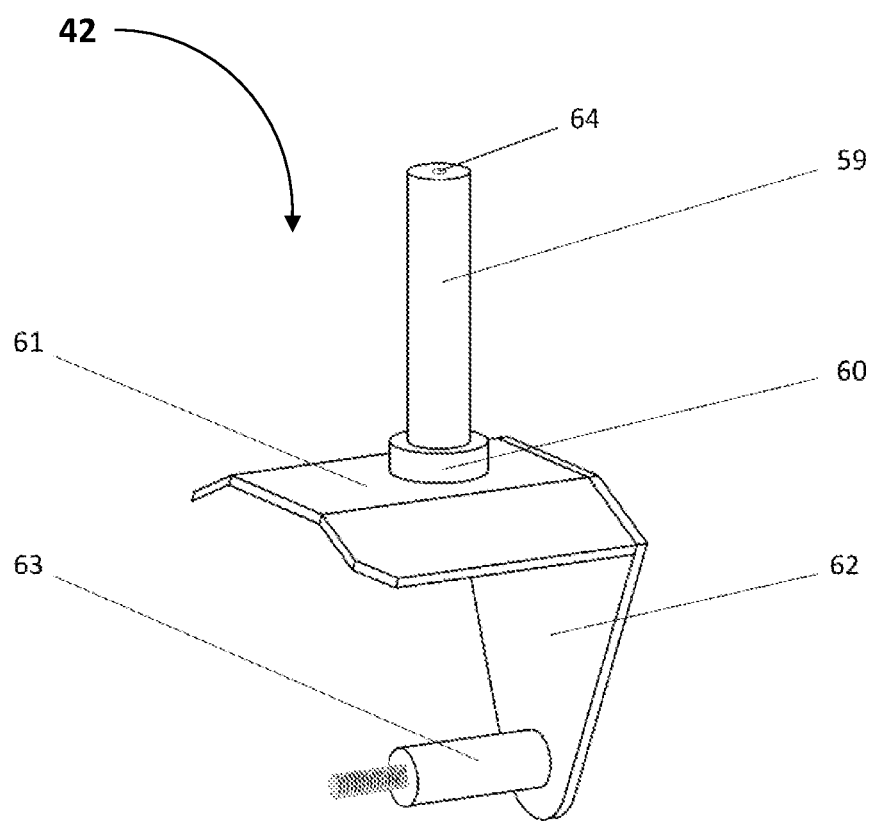

FIG. 13 is a perspective view of a wheel support.

Figure 14:
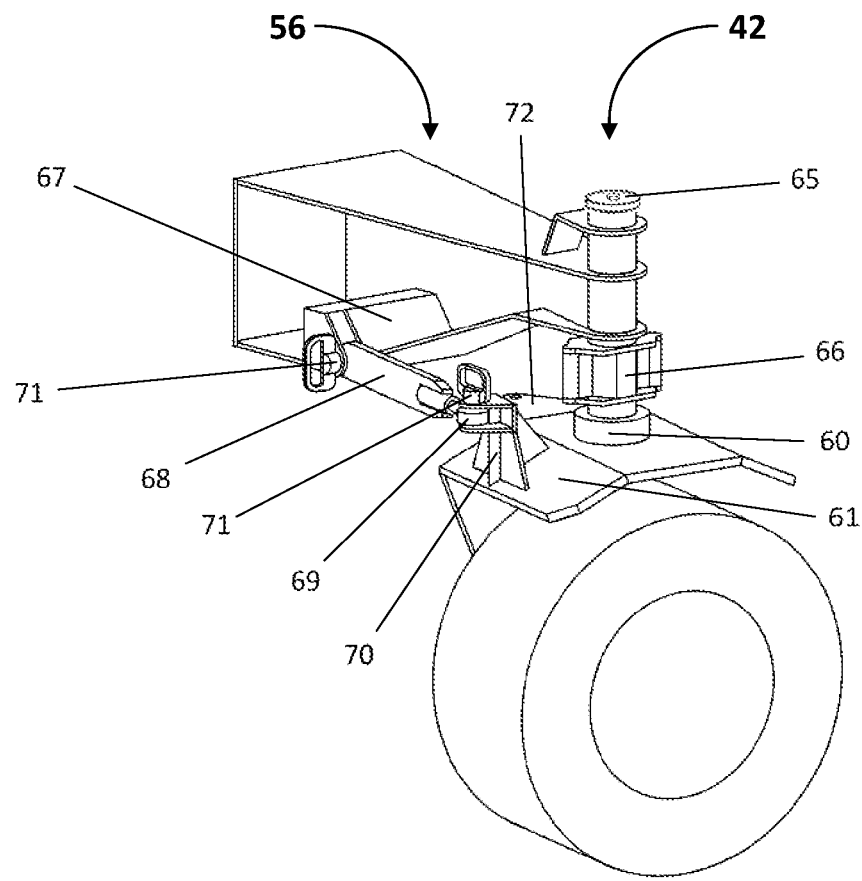

FIG. 14 is a perspective view of a single wheel on the left hand side of the grain bagger in transport position.

Figure 15:
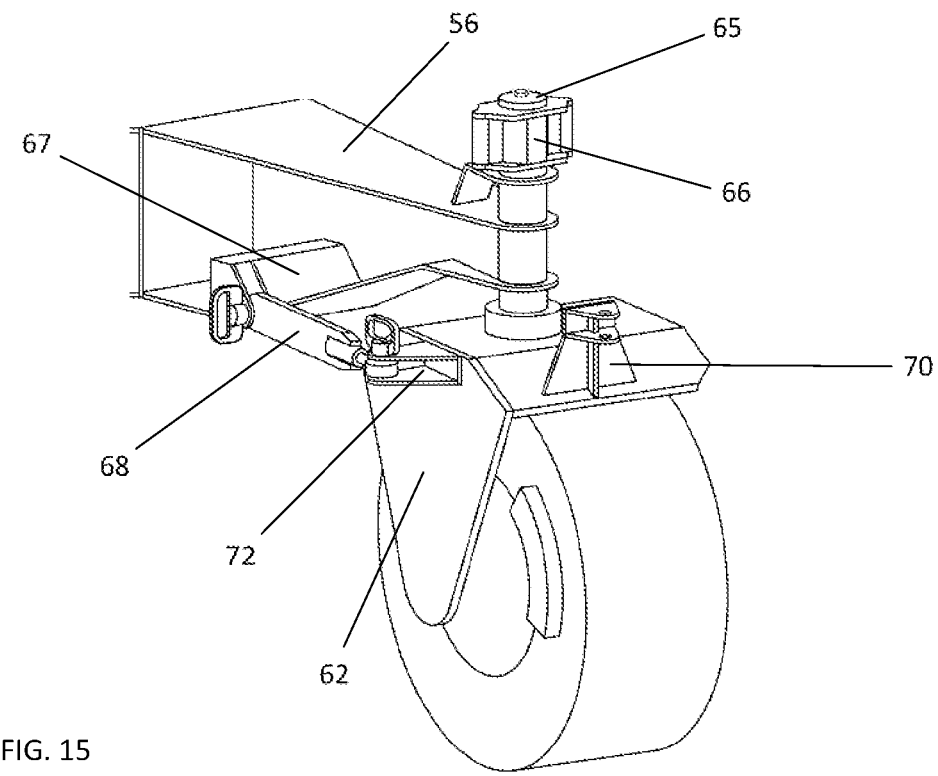

FIG. 15 is a perspective view of a single wheel on the left hand side of the grain bagger in work position.

Figure 16:
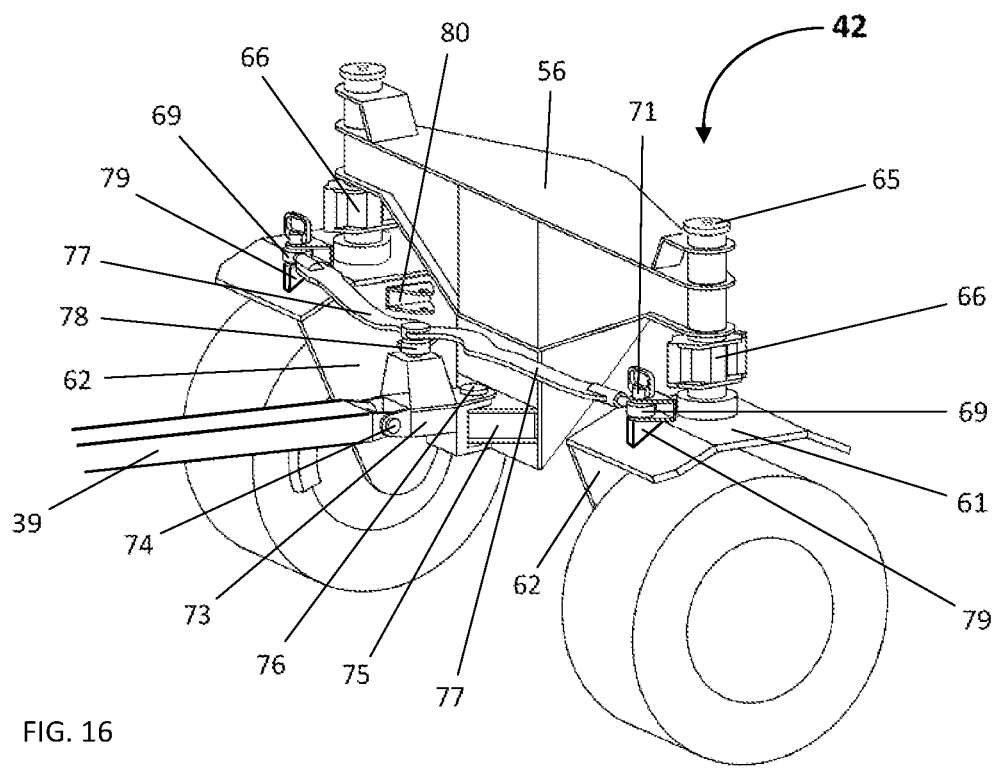

FIG. 16 is a perspective view of the right hand side wheel assembly in transport position.

Figure 17:
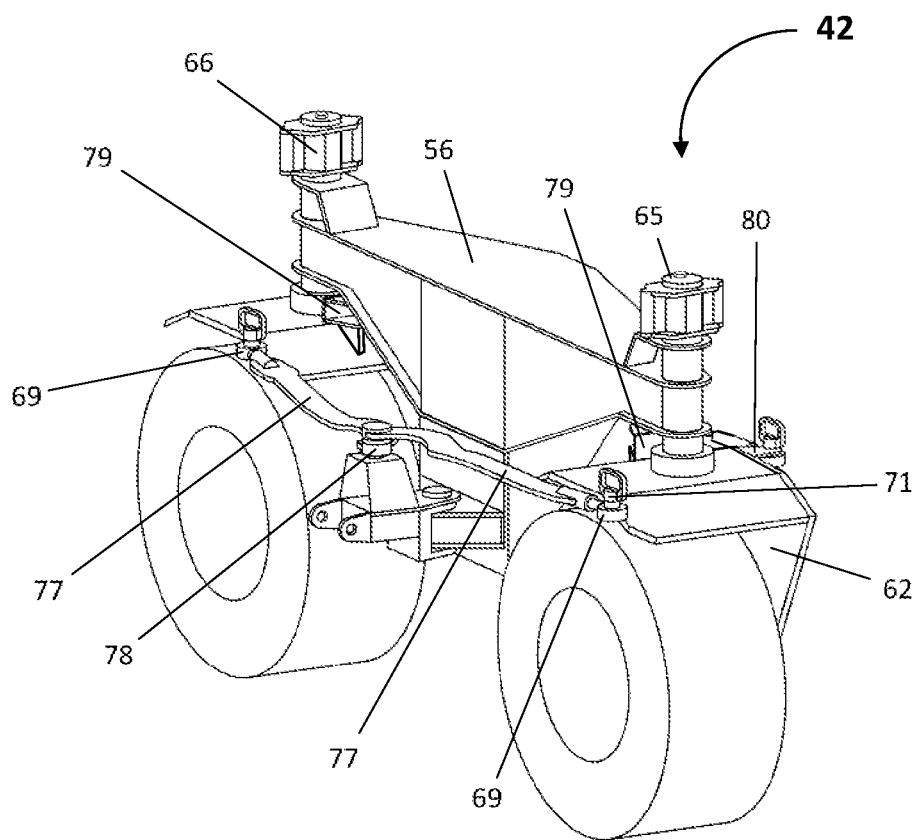

FIG. 17 is a perspective view of the right hand side wheel assembly in work position.

Figure 18:
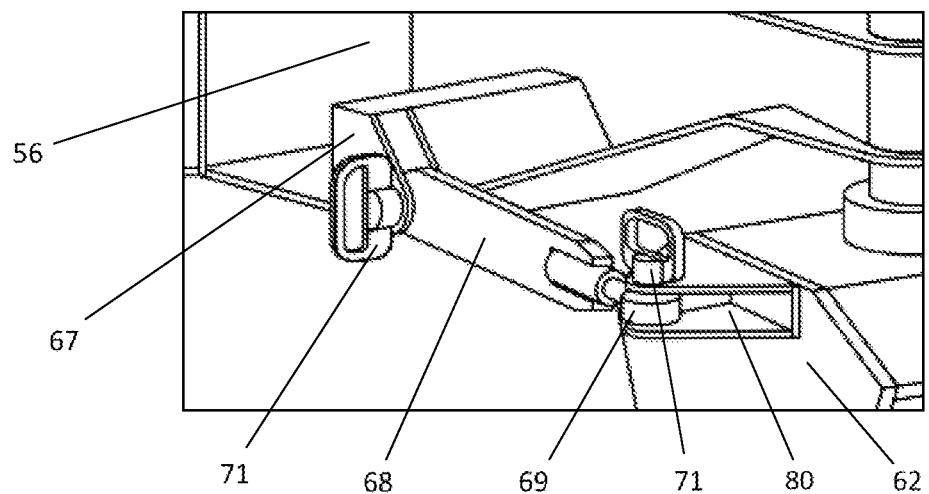

FIG. 18 is a perspective view of the locking system of a right hand side wheel in work position.

Figure 19:
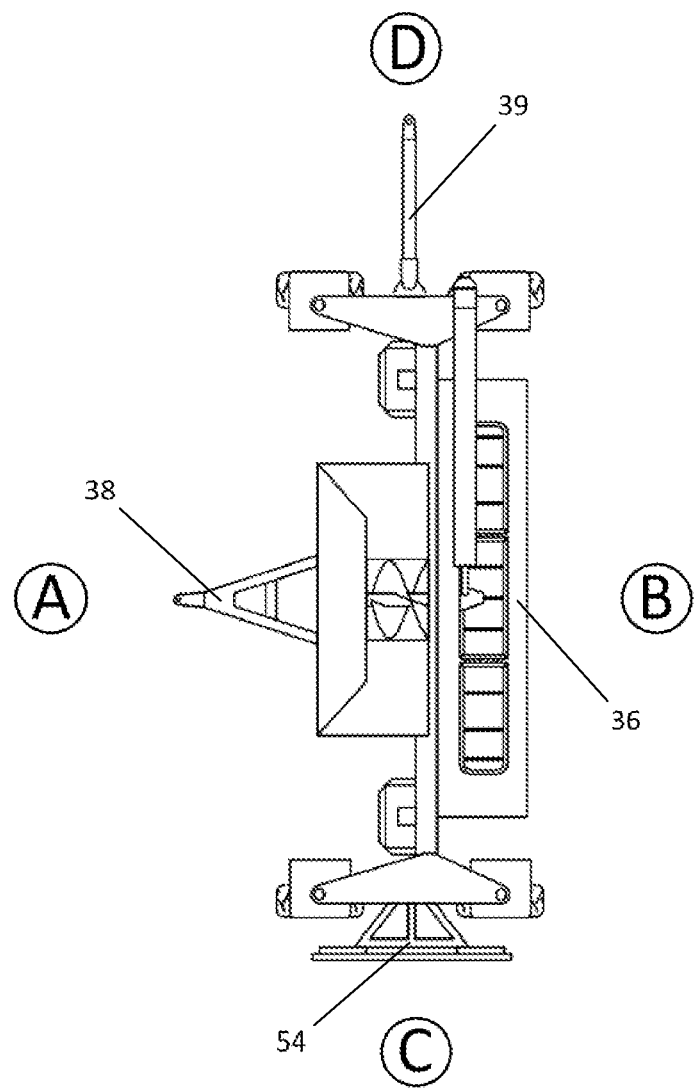

FIG. 19 is a schematic top side view tagging with capital letters the four sides of the grain bagger.

Figure 20:
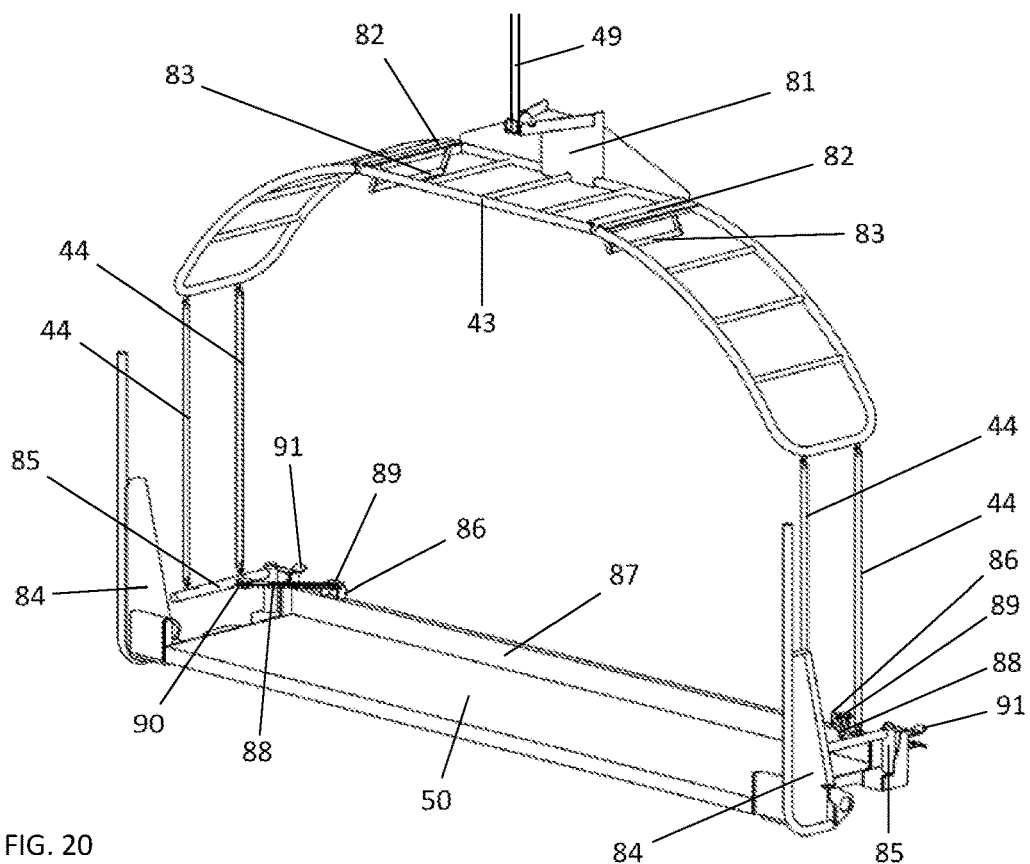

FIG. 20 is a perspective view of the bag tray hanging from the bag cradle by straps and with its retaining bars in extended position.

Figure 21:
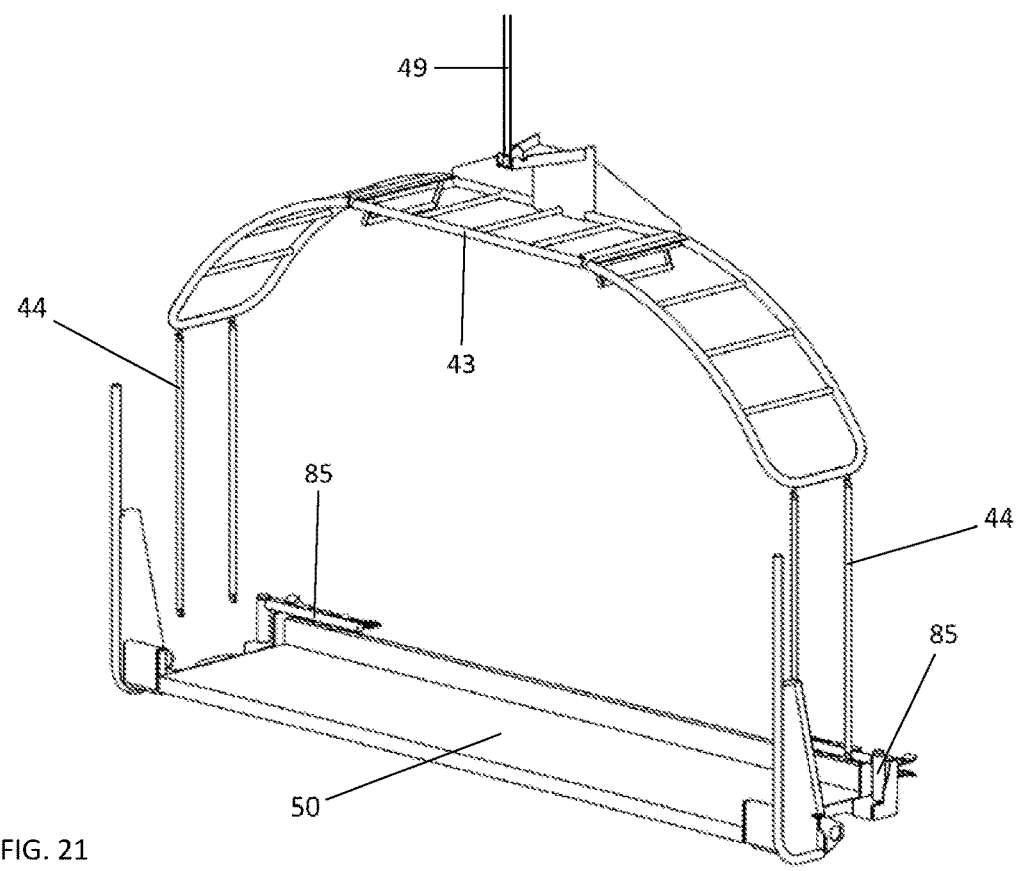

FIG. 21 is a perspective view of the bag cradle with its straps hanging loose and the bag cradle on the ground with its retaining bars in retracted position.

Figure 22:
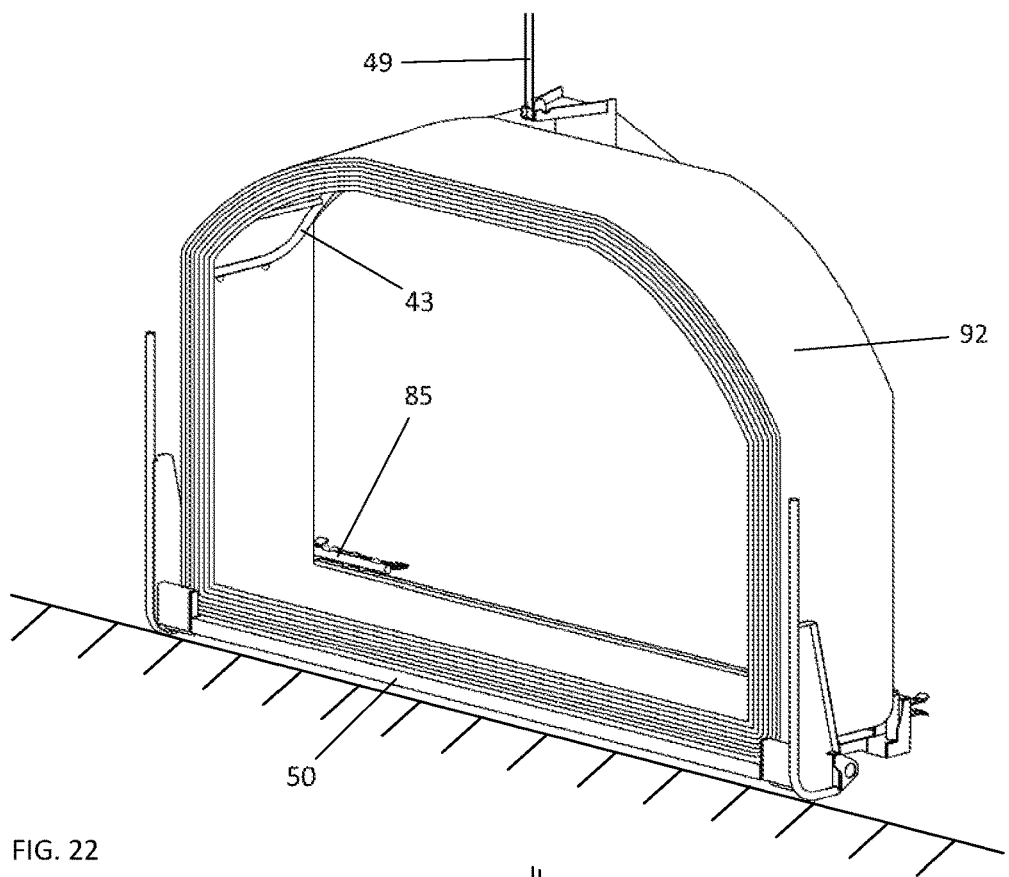

FIG. 22 is a perspective view of a folded silo bag mounted on the bag cradle and the bag tray, the latter with its retaining bars in retracted position.

Figure 23:
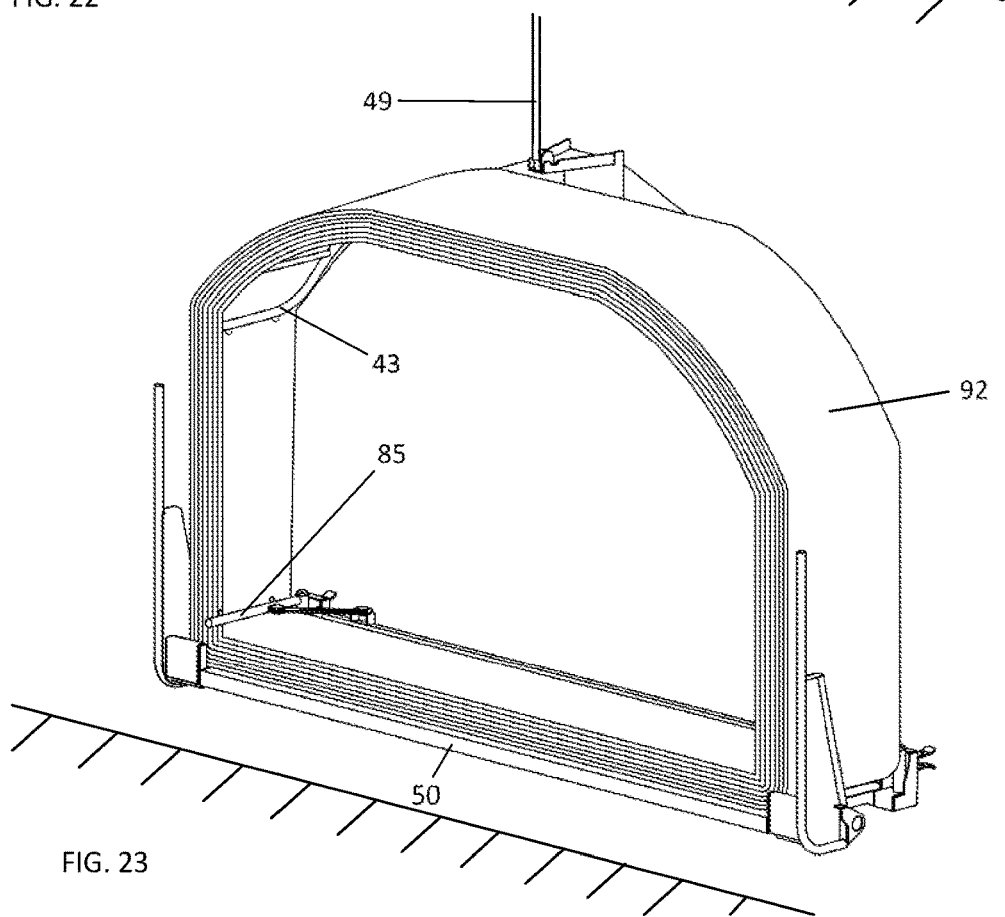

FIG. 23 is a perspective view of a folded silo bag mounted on the bag cradle and the bag tray, the latter with its retaining bars in extended position.

FIGS. 24 to 32 are schematic drawings of the sequential steps of installing a silo bag on the whole grain bagger, showing how the bag tray is detached from the frame, how the silo bag is mounted on the bag tray, and how the bag tray is once more reattached to the frame.

to reach auger conveyor 16. Tunnel 10 is partitioned off by back panel 11, the upper section of which links to auger tube 9 and the lower section of which slopes down at an angle for material to more easily slide into the bag. Bag tray 12 pivots freely on hinges 13 and rests on the floor. A floorboard 14

Figure 1:
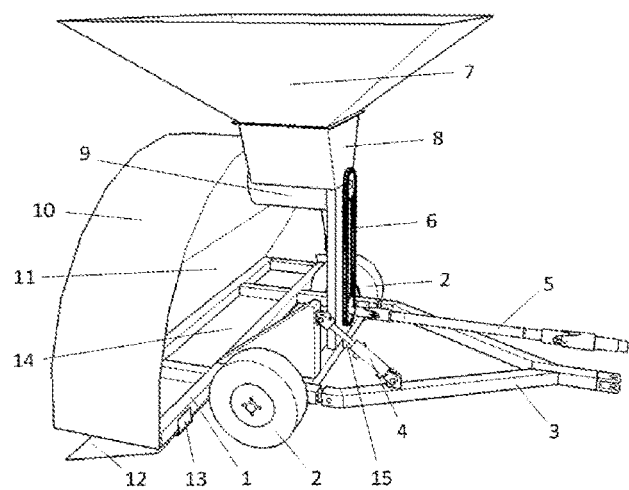
FIG. 1 is a perspective right side view of a prior art grain bagger in work position.
Figure 2:
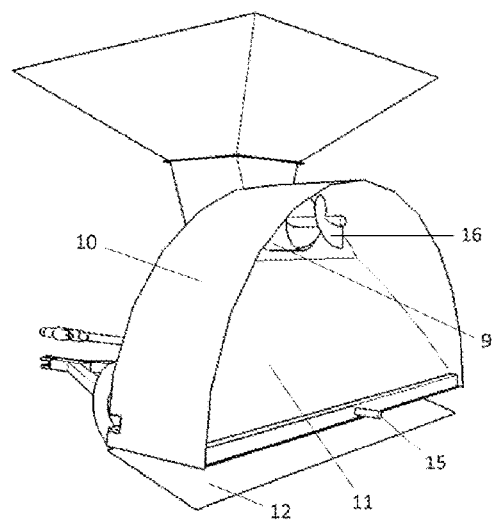
FIG. 2 is a perspective rear and left side view of a prior art grain bagger in work position.
Figure 3:
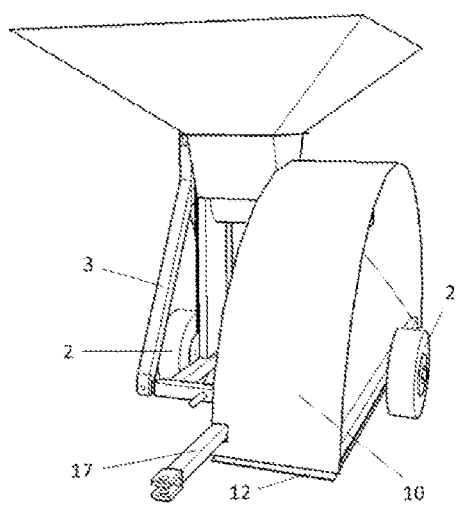
FIG. 3 is a perspective left side view of a prior art grain bagger in transport position.
Figure 4:
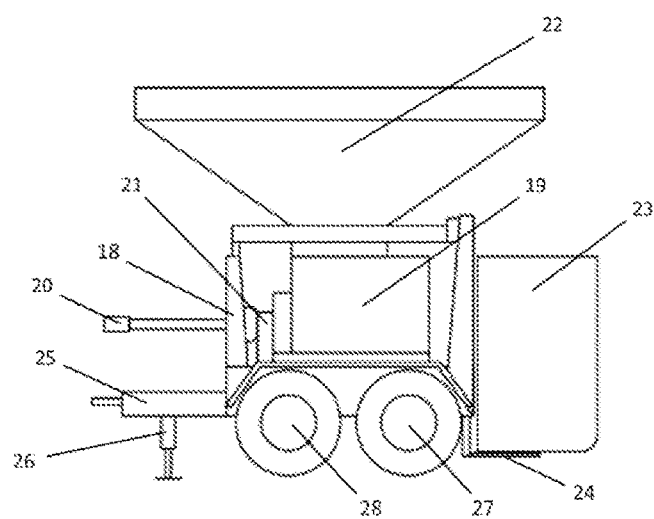
FIG. 4 is a right side view diagram of a prior art two-stage grain bagger equipped with a grain processing mill, in its single work and transport position.

| Drawings - Reference numerals | |
| --- | --- |
| FIGS. 1 TO 3 - PRIOR ART GRAIN BAGGERS | |
| 1) Frame | 2) Wheel |
| 3) Adjustable work tongue | 4) Hydraulic cylinder |
| 5) PTO (Power Take-Off) drive shaft | 6) Chain and sprocket drive |
| 7) Hopper | 8) Hopper base |
| 9) Auger tube | 10) Tunnel |
| 11) Back panel | 12) Bag tray |
| 13) Bag tray hinge | 14) Floorboard |
| 15) Wheel spindle | 16) Compression auger |
| 17) Fixed transport tongue | |
| FIG. 4 - PRIOR ART TWO-STAGE GRAIN BAGGERS | |
| 18) Frame  19) Grain grinding mill | 20) PTO drive shaft |
| 21) Grinding mill drive  22) Hopper | 23) Tunnel |
| 24) Bag tray  25) Fixed tongue | 26) Mechanical jack |
| 27) Rear wheel  28) Front wheel | |
| FIGS. 5 TO 32 - SELF-TRAILERING GRAIN BAGGING MACHINE ON FOUR WHEELS | |
| 29) Frame  30) PTO drive shaft  31) Gear | |
| 32) Drive sprocket  33) Driven sprocket  34) Hopper | |
| 35) Auger tube  36) Tunnel  37) Back panel | |
| 38) Work tongue  39) Transport tongue  40) Wheel | |
| 41) Disc brake  42) Wheel support  43) Bag cradle | |
| 44) Strap  45) Hydraulic crane  46) Splined stub | |
| 47) Gear box casing  48) Sprocket & chain casing  49) Hoist cable | |
| 50) Detachable bag tray  51) Compression auger  52) Hydraulic foot support | |
| 53) Crane hydraulic cylinder  54) Bumper  55) Hydraulic piston rod | |
| 56) Crossmember (both left and right sides)  57) Bushing  58) Reinforcement bracket | |
| 59) Vertical shaft  60) Bearing housing  61) Horizontal plate of wheel support | |
| 62) Vertical plate of wheel support  63) Wheel spindle  64) Threaded hole | |
| 65) Cap  66) Spacer  67) Anchoring base  68) Retaining rod | |
| 69) Spherical rod end  70) Anchoring bracket #1  71) Securing pin | |
| 72) Anchoring bracket #2  73) Tongue hitch  74) Hitch pin (horizontal) | |
| 75) Tongue base  76) Hitch pin (vertical)  77) Steering rod | |
| 78) Steering rod coupling  79) Anchoring bracket #3  80) Anchoring bracket #4 | |
| 81) Cradle hoist bracket  82) Cradle hinge assembly  83) Leg extension | |
| 84) Tray handle  85) Retaining bar  86) Support base  87) Backboard | |
| 88) Slotted crosspiece  89) Threaded knob  90) Pivoting bracket on retaining bar | |
| 91) Tray attachment bracket  92) Silo bag  93) Tray support base | |
| 94) Bag retaining rope | |

DETAILED DESCRIPTION AND OPERATION OF PRIOR ART GRAIN BAGGERS

FIG. 1 is a right side view of a prior art bagger in work position. Parts indicated are a frame 1, wheels 2, adjustable work tongue 3, and a hydraulic cylinder 4 to level the machine horizontally.

One end of the hydraulic cylinder is abutted against a section of frame 1 and the other end against adjustable work tongue 3. It is relevant to the present disclosure to point out that prior art grain baggers use this variation of a fixed type tongue and not a free swinging pull type tongue as shall be disclosed in the present application. Wheels 2 are fitted with disc brakes (not shown).

A drive shaft 5 provides power from a tractor's power take-off (PTO) and transmits this power via chain and sprocket drive 6 to a compression auger 16 (see FIG. 2) contained within compression auger tube 9. The means for mounting the silo bag atop the tunnel, and which is denominated as a bag cradle, are omitted in this description and drawings of prior art baggers.

Hopper 7 receives material conducted downward through hopper base 8 into auger tube 9 that has an opening for grain that is part of frame 1 impedes flow-back out into the open of material that is introduced in the silo bag. A wheel spindle 15 is attached to the central front section of frame 1.

FIG. 2 shows the rear and left side view of a prior art bagger in work position. Compression auger 16 enters the tunnel or chamber delimited by tunnel 10 and back panel 11. Bag tray 12 rests on the ground. A second spindle 15 is attached to the rear section of frame 1.

FIG. 3 shows a left side view of a prior art bagger set up in transport position. The wheels 2 are removed and mounted on spindles 15 (FIGS. 1 and 2) at the front and rear of the bagger, in a position perpendicular to how they are set up for work. Adjustable work tongue 3 is shown detached from hydraulic cylinder 4 (FIG. 1) in upward position.

A fixed transport tongue 17 is affixed firmly to frame 1 through a notched section of tunnel 10. Bag tray 12, attached to hinges 13 (FIG. 1), is pulled up and held flat against frame 1 by for road clearance during transport.

The bagger is attached to a tractor's drawbar through adjustable work tongue 3. This adjustable work tongue is a relevant aspect of two-wheeled prior art baggers and a crucial aspect of why the present specification differs fundamentally from prior art baggers. Adjustable work tongue 3 pivots at the base where it connects with frame 1. This can be clearly seen in FIG. 3, where work tongue 3 is disconnected from hydraulic cylinder 4 (FIG. 1) and folded up for transport. Although it can pivot, during work it is held in a fixed position by the hydraulic cylinder, thus acting in the manner of a fixed or rigid tongue.

In some grain baggers, the hydraulic cylinder is replaced by an adjustable threaded screw that serves the same purpose, propped by the tractor's drawbar, of fixing the tongue as third point of support (the wheels being the other two points of support). The object of using a hydraulic cylinder or an adjustable threaded screw to hold up work tongue 3 in place is to have the ability to vary the inclination of the grain bagger and thus reach the horizontal position that is the standard working position of baggers.

The tractor's gear-case is set to neutral so that the tractor wheels can turn freely, the engine is turned on and the tractor's power-take off (PTO) is engaged, causing chain and sprocket drive 6 to transmit movement to compression auger 16. Grain is introduced in a continuous stream by way of grain carts that advance alongside the bagger as filling proceeds, and is forced into the bag by the compression auger. The inflow of grain determines the expansion rate of the bag. As the bag unfolds, it slides down along tray 12 to facilitate deployment on the ground.

Detailed Description and Operation of Two-Stage Prior Art Grain Baggers

FIG. 4 is a left side schematic of a pull-type two-stage grain bagger supported by four wheels. These grain baggers have a frame 18 that supports a grain grinding mill 19 of either the roller mill or the hammer mill type. Power is delivered by a drive shaft 20 that takes it from the power take-off (PTO) of an attached tractor and transmits it through a drive system 21 to the grain grinding mill. Grain is originally introduced through hopper 22 from where it descends into the grain grinding mill. Once the grain is ground or crushed it further descends by gravity to the lower part of the grain mill from where it is conveyed to tunnel 23. This conveying action is done by a tube and compression auger system (not visible in the drawing) the process being similar to that of the prior art baggers already described.

FIG. 4 also shows bag tray 24 located under tunnel 23. The unit has a fixed tongue 25 and a mechanical jack 26 to hold it up when not in use and thus not supported by tractor or towing vehicle. The bagger can have its four wheels supported by two independent, fixed axles for its four wheels or be equipped with a four wheel bogie. In either case they do not turn left or right but do so as a single unit. Left side rear wheel 27 and left side front wheel 28 are visible.

High production two-stage grain baggers are heavy in lieu of the size and weights of the grinding mills required and so opt for a four wheel configuration. Because these four wheels are in close proximity to each other, they are usually arranged as a bogie system, meaning that all four wheels are mounted on a common subassembly and can follow terrain contours. Since this type of bagger is front-heavy, the bagger tongue rests firmly on the tractor's drawbar. This tongue is massive and rigid, basically a prolongation of the bagger frame. The four wheels on two-stage grain baggers always face forward and are not designed to be towed on roads. Since the wheels don't turn right or left they cannot follow a curve well and would be dragged at every turn of the road. They must instead be transported over distances on a trailer or platform.

Detailed Description and Operation of the Self-Trailering Grain Bagger Mounted on Four Wheels of the Present Specification FIG. 5 is a frontal and right side view of the grain bagger of the present disclosure in work position. A frame or platform 29 supports the machine structure. A driveline powers the machine and is depicted in FIG. 5 without the gear box casing and other protective casings that surround the working gears and transmission chains. Drive shaft 30 engages the tractor's power take-off (PTO) and in continuation through a first shaft and an intermediary gear connects with gear 31 to produce a rpm reduction. Gear 31 connects through a second shaft with drive sprocket 32 that transmits power through a roller chain to driven sprocket 33 coupled to compression auger 51 (FIG. 7). As any person skilled in the art will know, there are many ways of achieving the desired reduction for the compression auger. By way of example, belts and pulleys in place of chains and gears could achieve the same result.

Hopper 34 receives grain and converges to auger tube 35 that leads to tunnel 36 through back panel 37. Work tongue 38, centrally located at the front of the machine, pivots vertically at its base and attaches to the tractor's drawbar. On the right side of the machine, transport tongue 39 is folded in upward position. All four wheels 40 are fitted with brake discs 41. All wheels face forward in the direction of work and are mounted on wheel supports 42.

FIG. 6 is a frontal and right side view of the grain bagger in transport position. The drive components are shown shielded by corresponding gear box casing 47 and sprocket & chain casing 48. Splined stub 46 is the attachment point for PTO drive shaft 30 (FIG. 5).

Also shown in FIG. 6 is work tongue 38 folded upward while transport tongue 39 is slung forward for attachment to towing vehicle. Wheels 40 via their wheel supports 42 are gyrated 90° relative to their work position to transition to transport. The turning action is actuated by tongue 39, which not only has free swinging vertical motion, also pivots horizontally left and right to provide wheel orientation. The mechanism will be detailed in the present specification.

FIG. 7 is a rear and right side view of the grain bagger in work position. Within tube 35, compression auger 51 goes into tunnel 36 through back panel 37.

Both FIGS. 7 and 8 show a bag cradle 43 attached to a hydraulic crane 45 through a hoist cable 49. A hydraulic cylinder 53 (visible in FIG. 9) controls elevation of the upper arm of crane 45. The base of the hydraulic crane can also be swiveled round manually to position the components suspended from hoist cable 49 both frontward and backward.

FIG. 7 also depicts detachable bag tray 50 already detached from its anchor point and suspended from straps 44, but still positioned under the bagger frame. As anybody skilled in the art can determine, straps 44 can be replaced by cords, cables, chains or other support means. Transport tongue 39 is shown folded in upward position.

FIG. 8 shows a rear and right side view of the grain bagger in transport position. Transport tongue 39 is extended, ready for towing, and detachable bag tray 50 is secured to the bagger frame by its base and held fast against the floor of tunnel 36 to ensure sufficient road clearance. Shortly will be described the system by which the bag tray is connected and disconnected from the frame in handling the silo bag.

Set up in the way described, on initiation of work the tractor's gear-case is set to neutral so that its wheels can turn freely. The driveline turns sprocket 33 (visible in FIG. 5) and grain is introduced in through hopper 34 by grain wagons that alternate alongside the bagger to provide a continuous feed rate. As the bag unfolds with the incoming grain forced in by compression auger 51, it eases onto the ground sliding over bag tray 50 and rapidly becomes an unmovable mass.

Since bag, bagger and tractor form an integrated system, this expansion pushes and propels the movable components—namely the bagger and the power-providing tractor—as long as grain input continues. Because the least possible amount of air should remain trapped inside the bag for long term storage, adequate compression is crucial. To achieve this, it is normally not enough with the resistance provided by the combined mass of tractor and bagger, so added resistance is supplied by brakes 41. Their stopping power is graduated by adding more or less hydraulic pressure to the calipers actuating on the brake discs, adding traction resistance to tractor and bagger as needed for optimum compaction of grain inside the silo bag. The hydraulic controls and circuits that regulate brake pressure in grain baggers are mounted on the bagger itself (not shown or detailed in this specification) and are independent of the tractor's circuit. Hydraulic pressure is supplied by a hand pump also installed on the bagger itself. Marker lines printed on the bag are monitored with a measuring tape to graduate brake pressure and keep plastic stretch within established limits.

FIG. 9 is a schematic front side view of the grain bagger in work position in which bag cradle 43 sits atop tunnel 36. Hydraulic crane 45 is shown with hydraulic cylinder 53 (not depicted in the previous drawings) that raises and lowers the crane's articulated arm. Work tongue 38 is on the ground and transport tongue 39 is folded upward. A bumper 54 is intended for road travel. Two hydraulic foot supports 52 are observed towards the left and right sides of the bagger. These foot supports are in a retracted position and are driven by hydraulic cylinders or actuators mounted within frame 29.

FIG. 10 shows the same front side view of the grain bagger. Here hydraulic foot supports 52 are extended to reach the ground. The foot supports are attached to hydraulic rods 55 that are part of the hydraulic cylinders, and are used when transitioning from work position to transport position and vice versa. They lift up the right or left end of frame 29, not simultaneously but one at a time. In this way weight is lifted from the corresponding wheels so that spacers 66 (see FIGS. 14 and 15) may be repositioned in order that the machine is set at its high position (for transport) or at its low position (for work).

FIG. 11 is a top view of the bagger in transport position that shows the general arrangement of elements and introduces some new elements. For convenience, frame 29 is sub-partitioned into crossmembers 56 on the left and right sides of the bagger (depicted respectively by letters "C" and "D" in FIG. 19). Because both crossmembers are similar they are assigned the same identification number. Nevertheless they have different functionalities and thus are named in the present specification as left crossmember or right crossmember respectively. In transport position, left crossmember 56 keeps its wheels locked in place in the towing direction of travel while right crossmember 56 allows its wheels to align angularly with tongue 39 and follow the path dictated by the pulling vehicle.

In work position both left side and right side crossmembers keep their wheels locked in the direction of work, as can be seen in FIGS. 5, 7 and 10.

Back to FIG. 11, other elements shown are hopper 34, tunnel 36, wheel supports 42, bag cradle 43, hydraulic crane 45, compression auger 51, foot supports 52 and bumper 54.

FIG. 12 is a drawing of a crossmember 56 showing its box structure and at its extremities inbuilt bushings 57. Reinforcement brackets 58 further buttress the bushing sections that project above the box structure of crossmember 56.

One crossmember is welded to each extremity of frame 29 (FIG. 11). FIG. 12 shows the crossmember structure's convex side facing outward, i.e., taking as a reference FIG. 11, the side that directly faces bumper 54 in the case of left crossmember 56, and the side that directly faces tongue 39 in the case of right crossmember 56.

FIG. 13 is a drawing of a wheel wheel support 42. Each wheel support has a vertical shaft 59 at the base of which is a bearing housing 60 holding a thrust bearing that allows shaft 59 to rotate. The thrust bearing connects vertical shaft 59 with a horizontal plate 61. Vertical plate 62 is in turn welded to the latter and acts as support of a wheel spindle 63 on which will be mounted a wheel hub, brake disc and other components of a wheel assembly. A threaded hole 64 is at the apex of vertical shaft 59.

FIG. 14 is a drawing of one of the wheel assemblies mounted on left crossmember 56 (side C in FIG. 19) in transport position. The view shows the concave side of left hand crossmember 56, i.e., the side that faces inwardly toward frame 29 (FIG. 11). Bushings 57 are inserted in crossmember 56.

Observing FIG. 14 (and FIGS. 12, 13, and 15) it can be seen that shaft 59 of wheel support 42 goes into bushing 57 of crossmember 56 and is secured with a washer or cap 65 through which is inserted a bolt that screws into a threaded hole 64.

A hinged spacer 66 is wrapped around the lower section of vertical shaft 59 (FIG. 13). The hinge of spacer 66 is vertical with a retaining pin on the opposite side of the spacer, so that it can be removed sideways from shaft 59 to reposition it once again on the shaft when transitioning to work position.

In this manner and at their lowest position enfolding shafts 59, spacers 66 support crossmembers 56 (both the left hand and the right hand side crossmembers, see FIGS. 14 and 16) and by extension support the whole of frame 29 with maximum clearance to the ground in transport mode. Bearing housing 60 is visible. Other parts depicted are an anchoring base 67 welded to crossmember 56, a retaining rod 68 fitted with an adjustable spherical rod end 69, an anchoring bracket 70 welded to horizontal plate 61 and securing pins 71, all of which provide correct alignment of the wheels mounted on left hand crossmember 56 while towing the bagger.

An anchoring bracket 72, not in use during transport, is visible in the background. To switch from transport to work position, the left side of the bagger is hydraulically raised (FIGS. 10 and 19), therefore raising left side crossmember 56, causing the weight of both left wheels to be sustained by caps 65 and therefore lightening the load on spacers 66 that can be removed. Then the bagger is hydraulically lowered, allowing the crossmember to come to rest upon bearing housings 60. Finally, the spacers are stored on the upper sections of wheel supports 42 (FIG. 15).

FIG. 15 shows the same view of the wheel assembly of FIG. 14, set in work position. Spacer 66 is moved so that it enfolds the higher section of shaft 59 (FIG. 13) and is secured there with cap 65 and its corresponding bolt screwed into threaded hole 64. With no in-between spacers, both left and right side crossmembers 56 (see FIGS. 15 and 17) lower the bagger's height, decreasing clearance to the ground in work mode. With relation to previous FIG. 14, wheel support 42 has swiveled 90° and anchoring bracket 72 attached to vertical plate 62 has taken the position previously occupied by anchoring bracket 70, thus holding the wheel support in place by means of a securing pin 71.

To switch from work to transport, spacers 66 of both left side wheels are removed from the upper position they occupy on their respective wheel supports 42. Then the left side of the bagger is hydraulically raised (FIGS. 10 and 19), causing corresponding left crossmember 56 to slide upward—due to the weight of the wheels themselves—until detained by caps 65. This leaves free space to mount spacers 66 on the lower sections of wheel supports 42 (FIG. 14). As a final step the bagger is lowered hydraulically to the ground.

FIG. 16 is a drawing of both wheel assemblies mounted on right hand crossmember 56 (side D in FIG. 19) in transport position. The view shows the convex side of right hand crossmember 56, i.e., the side that faces transport tongue 39. In this picture spacers 66 are located on the lower section of shafts 59 (FIG. 13) and right hand crossmember 56 is mounted atop the spacers. Transport tongue 39 connects to a tongue hitch 73 through horizontal hitch pin 74 that allows the tongue free vertical movement. Tongue hitch 73 in turn is attached to tongue base 75 through a vertical hitch pin 76 that permits side to side motion. Two steering rods 77 are joined at steering rod coupling 78, which rotates and permits synchronous wheel turning action. At their other end, the steering rods terminate in adjustable spherical rod ends 69, held fast to anchoring brackets 79 with pins 71. Brackets 79 are welded to horizontal plates 61. An anchoring bracket 80, not used in transport mode, can be seen attached to one of vertical plates 62. The procedure for switching to transport mode is a sequence similar to that explained for FIG. 14, the only difference being it is carried out on the right hand side of the bagger, on corresponding right crossmember 56.

FIG. 17 shows the same twin wheel assembly of FIG. 16, set in work position. Spacers 66 appear above right crossmember 66, secured by caps 65.

In FIG. 17, With relation to previous FIG. 16, both wheel supports 42 are gyrated by 90° and steering rods 77 with their spherical rod ends 69 are therefore uncoupled from anchoring brackets 79. The steering rods are now supported only by steering coupling 78. Anchoring brackets 80 have turned and one of them is visible on vertical plate 62. Brackets 80 lock the wheels in work position as will be seen in FIG. 18.

The procedure for switching from work to transport position is a sequence similar to that already explained in FIG. 15, but carried out on the right side of the bagger via corresponding right crossmember 56.

FIG. 18 shows the concave side of right crossmember 56 and the locking mechanism of one of its wheels set in work position. A pivoting retaining rod 68 connects to an anchoring base 67 by means of a securing pin 71. The other end of retaining rod 68 carries a spherical rod end 69, which is adjustable in length and connects to an anchoring bracket 80 through a second securing pin 71. Bracket 80 is in turn welded to vertical plate 62.

FIG. 19 is a schematic of a top view of the bagger showing its conceptual construction in work position that locates the front, rear, left and right sides of the machine. These are described throughout the present specification with the letters A (front side), B (rear side), C (left hand side) and D (right hand side). It identifies these sides by their proximity to basic machine components that are defined in the present specification; thus front side (A) is referenced by work tongue 38, rear side (B) is referenced by tunnel 36, left side (C) is referenced by bumper 54, and right side (D) is referenced by transport tongue 39.

In FIGS. 20 and 21 we observe elements related to mounting the bag on the bagger, fundamentally two of the primary components: bag cradle 43 and detachable bag tray 50.

Bag cradle 43 has a hoist bracket 81 that attaches to hoist cable 49. Cradle 43 possesses two hinge assemblies 82 that delimit and define a central section, which includes hoist bracket 81, and two adjoining lateral sections from which hang four holding straps 44 but could actually be more straps or even one strap per side.

Each strap 44 has hooks at its ends for attachment to the rings welded to the outer lateral sections of mentioned bag cradle 43.

Hinge assemblies 82 lock the lateral sections in place when they face downward with gravity pulling them down, and also lets them turn upward. When cradle 43 is laid down on the ground in one of the steps involved in mounting the bag, the lateral sections pivot up and the cradle does not remain a rigid semicircular structure but instead adopts an almost flat shape (see FIG. 28), allowing the operator to use less physical force when mounting the bag.

A pair of leg extensions 83 are welded to cradle 43 and are tasked with supporting the cradle atop tunnel 36 whilst providing a certain clearance between cradle and tunnel (FIGS. 9 and 10).

In FIG. 20 the whole set of components shown hangs from hoist cable 49. Detachable bag tray 50 is shown detached from the frame. When attached, the bag tray is positioned adjacent to the bottom part of tunnel 36, configuring its base (see FIGS. 24, 31 and 32). New elements are shown here that are relevant to the present disclosure and were not previously described. Tray handles 84 are used by operators to maneuver the tray when it is removed from the bagger frame (by manually pulling the tray outward) and when it is reinstalled on the frame (by manually pushing the tray inward).

Two retaining bars 85 are located at the extremities of tray 50. Being adjustable, these retaining bars act as supports for the bag when the latter is installed on the tray. The bars swivel across a 90° arc on the horizontal plane, and can be locked fast at each end of their ninety degree travel. Each retaining bar 85 has an "L" letter shape and is composed of a vertical segment of pipe firmly joined to the base of tray 50 through a bushing that allows it to rotate, and of a complementary horizontal segment of pipe fitted with rings that attach to the hooks on the ends of holding straps 44. In this way, tray 50 actually hangs from cradle 43 by way of straps 44 and retaining bars 85. The retaining bars are shown in their extended or open position, appropriate for tray 50 to maintain a stable position as it hangs from cradle 43.

In FIGS. 20 and 21 can be seen, at the rear of bag tray 50 and running all along its length, a backboard 87 that helps contain the bag's folds within the tray. On this backboard and near each of its left and right ends there is a supporting base 86, and a threaded knob 89 screws onto each supporting base. On each retaining bar 85 a pivoting bracket 90 holds a slotted crosspiece 88, the slot of which can run freely through corresponding threaded knob 89. This allows fixing the horizontal angle of retaining bars 85 and we can consider their extended position in FIG. 20 as corresponding to a 90° angular aperture. With this aperture, threaded knobs 89 are screwed tight to press down slotted crosspieces 88 against supporting bases 86, thus fixing the retaining bars in place. Two attachment brackets 91 allow connection and disconnection of tray 50 to the bagger frame.

Figure 25:
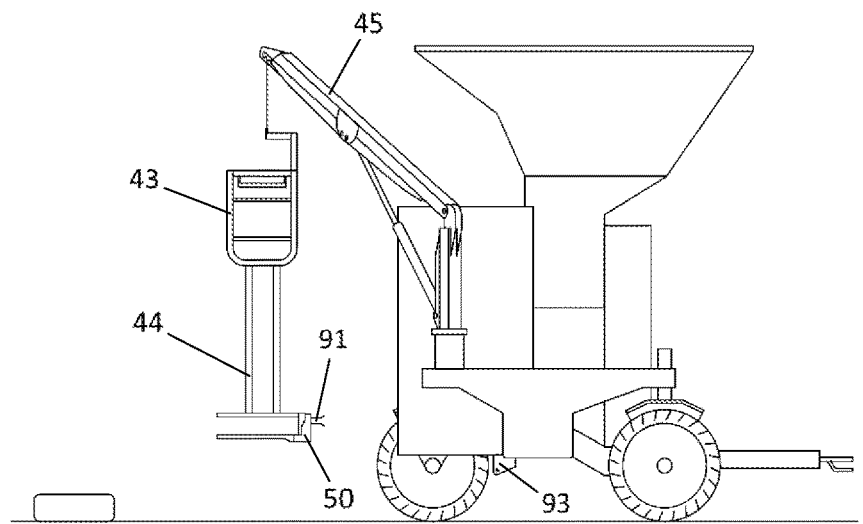

The bag set-up phase shown in FIG. 20 is represented also in FIG. 25 in the complete bag set-up sequence that will be shown.

FIG. 21 shows straps 44 hanging loose from cradle 43 and not attached to tray 50 that rests on the ground. Retaining bars 85 are retracted, having rotated ¼ of a circumference to a position representing an angular aperture of 0°. The bag set-up phase shown in FIG. 21 is also representative of an intermediate step between FIGS. 26 and 27 in the complete bag set-up sequence that will be shown shortly.

FIG. 22 shows the same arrangement of components as FIG. 21 but with a silo bag installed, the bag forming a ring open at the front and rear. The upper internal part of the bag is supported by cradle 43 while the lower external part of the bag rests on tray 43. It can be seen that straps 44 have been removed because they serve no purpose once the bag is installed on cradle and tray, as will be seen presently. The retaining bars are retracted (0° angular aperture) in order to place the bag over tray 50 with no interference. At this point, hoist cable 49 just supports the weight of cradle 43 and only partially the weight of bag 92 because tray 50 and the lower section of the bag are lying on the ground.

Figure 29:
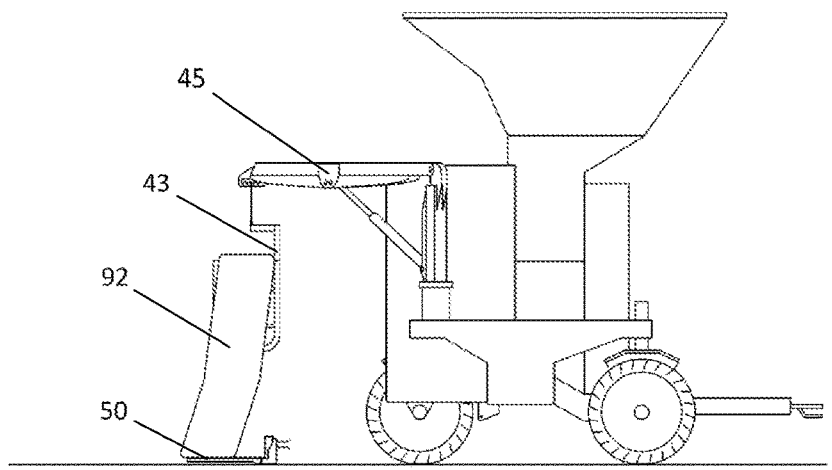

The bag set-up phase shown in FIG. 22 is represented also in FIG. 29 in the complete bag set-up sequence that will be shown.

FIG. 23 shows that retaining bars 85 are set to their extended positions (90° angular aperture) and fixed in that position through the locking mechanism formed by parts 86, 88, 89 and 90 shown in FIG. 20. In this position cradle 43 and tray 50 with all their accompanying parts plus the silo bag itself are elevated from the ground, hanging from hoist cable 49. Note that the specific component now holding tray 50 up in the air is silo bag 92 that has replaced the straps 44 of FIG. 20. Extending retaining bars 85 from a 0° (FIG. 22) to a 90° angle produces the locking action between tray 50 and bag 92 that allows the latter to act as the support means.

Figure 30:
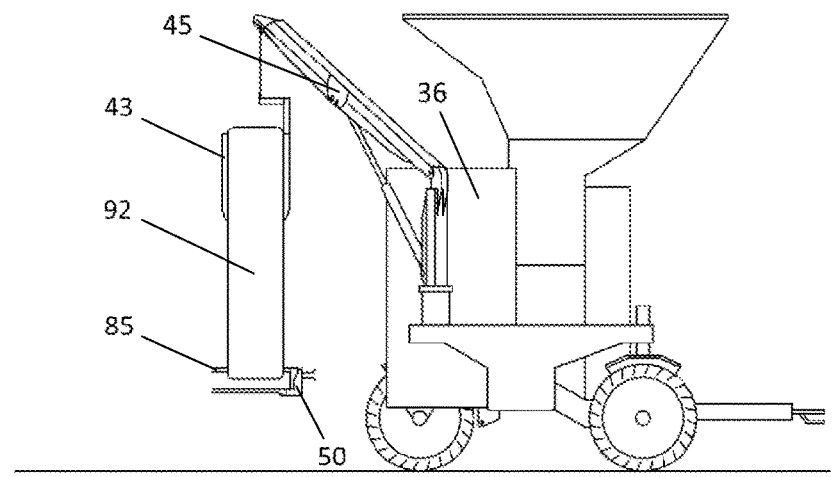

The bag set-up phase shown in FIG. 23 is represented also in FIG. 30 in the complete bag set-up sequence that will be shown shortly.

Sequence of Setting Up the Bag on the Bagger with the Tray Detached from the Frame The following schematic figures show the bagging machine of the present disclosure seen from its right side (side "D" in FIG. 19). A number of non-relevant elements are omitted to simplify the graphics, as for example transport tongue 39 (FIG. 19) and tray handles 84 (FIG. 20).

Also in order to view details of how tray 50 attaches to the frame, the rear right side wheel is left out of the drawings. A further modality or embodiment that is perceivable in these schematic drawings is the possibility of using an electric winch to supplement and extend the reach of hydraulic crane 45 and hoist cable 49. Instead of having a fixed length hoist cable attached to the extremity of the articulated arm of hydraulic crane 45, having the ability to vary the length of the hoist cable 49 through an electric winch managed through the bagger controls can offer more versatility when mounting the bag on the machine. However, it should be pointed out that a crane designed with adequate reach and range of movements will not require a supplementary winch to perform all maneuvers needed for installing a bag on the machine.

Figure 24:
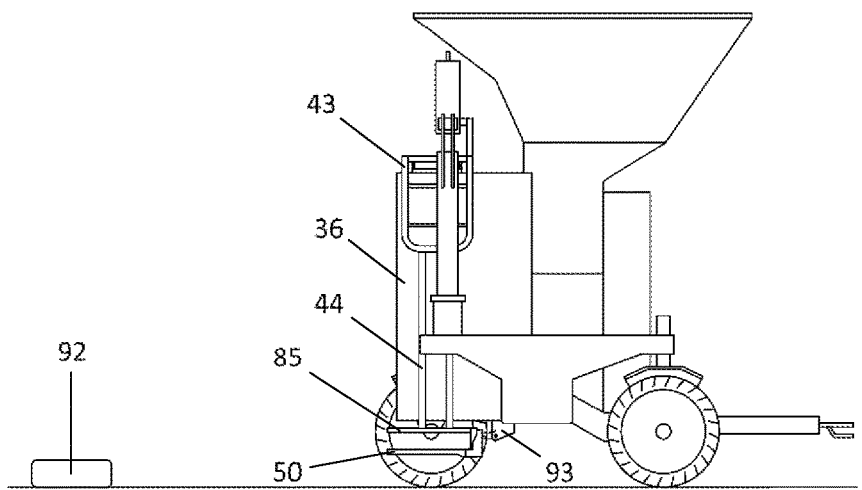

FIG. 24 shows the bagger of the present specification on initiation of silo bag 92 installation procedures. The folded silo bag lies on the ground a certain distance away from the opening of tunnel 36. On the tunnel is cradle 43 and from it hang straps 44 that in turn are attached to retaining bars 85 that in turn form part of tray 50. The tray is connected to the machine frame through its attachment brackets 91 (visible in FIGS. 20 and 26) that hook up the tray to a pair of support bases 93 by means of pins secured with R-clips. In this way, tray 50 can pivot freely and take a horizontal or inclined position. Different attachment and pivoting variants for the bag tray can be utilized here to achieve the same end result.

FIG. 25 shows tray 50 with its tray attachment brackets 91 unhooked from support bases 93. Hydraulic crane 45 holds up cradle 43 that then, manually turning the pivoting base of the crane inward toward central section of the machine, in turn supports tray 50 up in the air dangling from straps 44.

Figure 26:
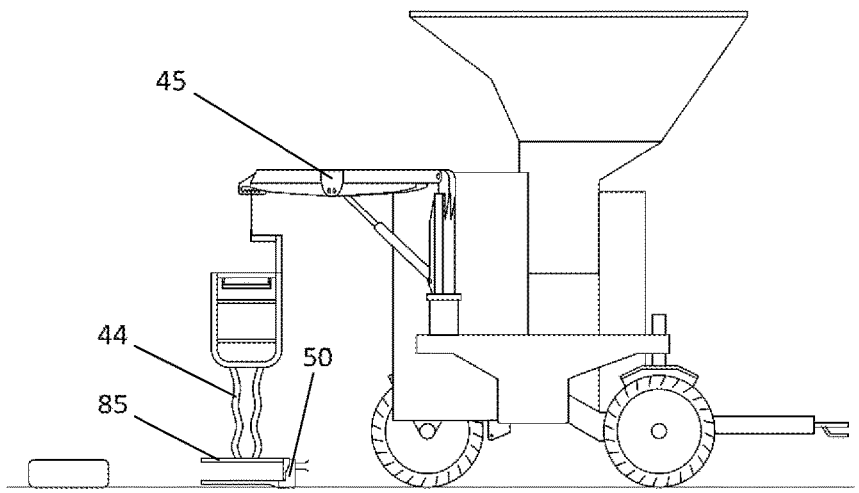

FIG. 26 shows crane 45 descending until tray 50 lays on the ground. At this point straps 44, which are attached to retaining bars 85 in order to hold up tray 50, have served their purpose and are no longer needed.

Figure 27:
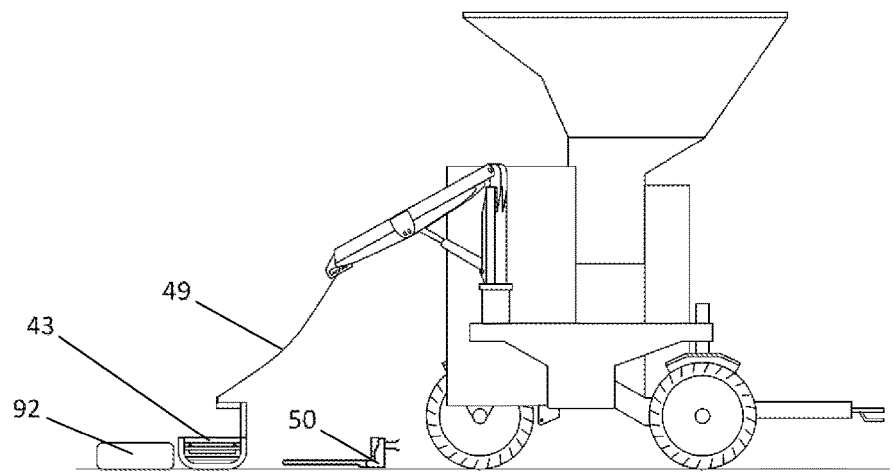

FIG. 27 shows straps 44 already removed from cradle and tray, whilst retaining bars 85 are no longer visible; they have been turned 90° inward to their retracted position so as not to obstruct bag placement. Without straps attached, tray 50 is observed lying nearest to the tunnel. Then, after further lowering the crane and extending hoist cable 49 by means of the electric winch, cradle 43 is manually positioned in between tray 50 and folded bag 92, adjacent to both. Due to its hinge assemblies 82, the cradle has flattened on the ground, having lost the curved shape it exhibited when stowed on the tunnel or hanging in mid-air.

Figure 28:
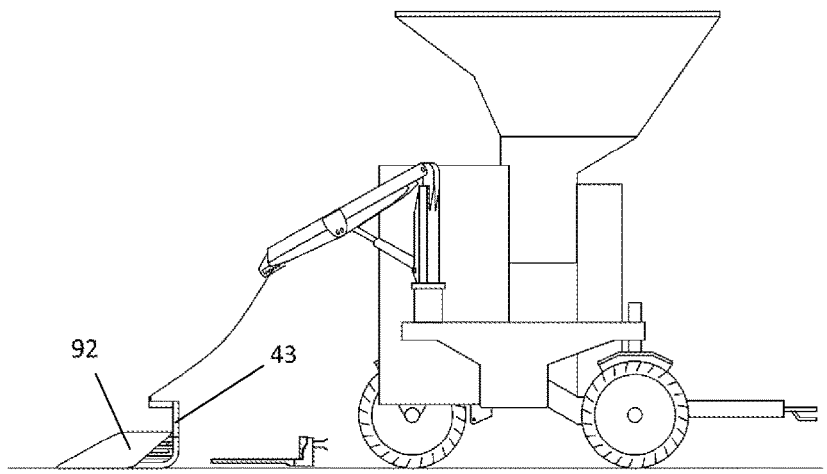

FIG. 28 shows bag 92 beginning to be placed over cradle 43. The bag is folded in the manner of a ring having many dozens and on occasion hundreds of folds, and it is the upper portion of this ring that is placed over the cradle.

FIG. 29 shows a more advanced stage of the bag set up process with components still on the ground. Upon raising hydraulic crane 45, bag 92 settles on cradle 43 and lightens in weight to end up aligning vertically with tray 50. This eases the operator's task of mounting on the tray the lower half of the ring formed by the folded bag. Note that at this point in time retaining bars 85 (not visible) continue in their retracted or closed position. Once the bag is fully positioned on tray 50 and the latter is still lying on the ground, retaining bars 85 are turned 90° outward and then locked in position, in this way remaining extended within the ring formed by the bag.

FIG. 30 shows hydraulic crane 45 at about its highest position, and suspended from it are cradle 43, bag 92 and tray 50. By holding up tray 50 via retaining bars 50 in extended position, bag 92 accomplishes the task carried out by straps 44 in a previous step. Once the cradle has gained clearance above tunnel 36, the pivoting base of crane 45 is turned inward to accomplish positioning of cradle and bag over the tunnel. Simultaneously, tray 50 will have clearance to slide under the frame, close to its anchoring point there.

Figure 31:
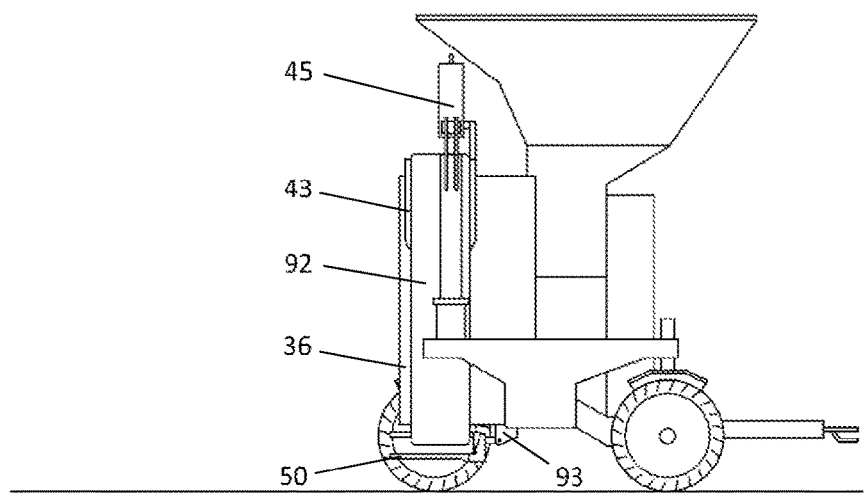

FIG. 31 shows hydraulic crane 45 once again in its original position of FIG. 24. Bag 92 is on cradle 43 and surrounds the whole perimeter of tunnel 46. Tray 50 is once again attached to its support bases 93 from which it can pivot.

Figure 32:
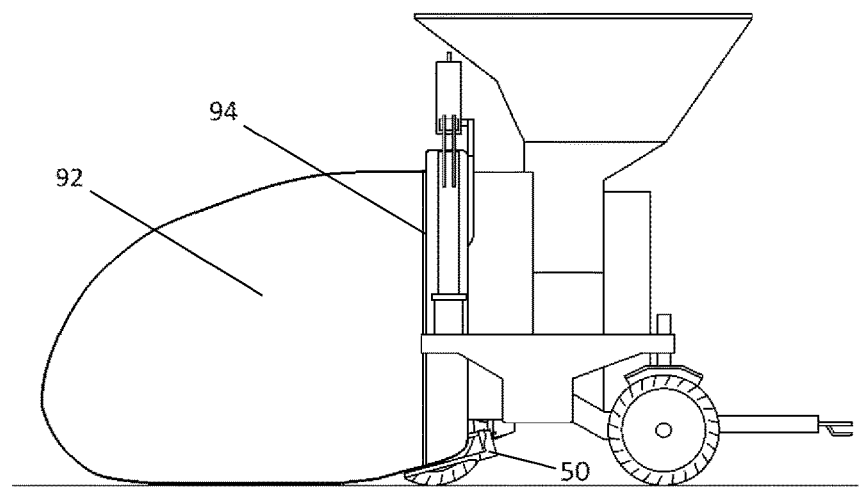

FIG. 32 shows bag 92 beginning to fill up. The bag becomes immobile almost at once. The ring shaped folded bag is pulled out continuously from the innermost fold and from beneath bag retaining rope 94 to the same extent bagger and accompanying tractor are pushed forward as the bag lengthens. Being tensioned, retaining rope 94 keeps hold of the plastic bag folds that can only exit gradually, inch by inch and one fold at a time. If the folds were not contained and all of them were to unfold at once, it would not be possible to compress grain inside the bag. Weighed down by the grain, tray 50 is at a sloping angle touching the ground.

What is claimed is:

1. A self-trailering grain bagging machine on four wheels conceived for storing different types of grains and seeds inside an elongated bag known as a silo bag, comprising a grain receiving hopper within which a compression auger encased in an auger tube is positioned, said compression auger driven by mechanical means powered from a tractor's power take-off to fill said silo bag, a tunnel around which is wrapped said silo bag initially in folded condition, said bagging machine characterized in that it is mounted on a frame fitted with paired crossmembers at its left and right hand sides, each of said crossmembers mounted upon a pair of wheel supports whereby said wheel supports are capable of gyrating relative to said crossmembers by means that comprise shafts and bearings, each of said wheel supports carrying one wheel whereby said wheel gyrates along with said wheel support, a work tongue attached to the frontal side of said frame, said work tongue able to pivot relative to a horizontal axis, a transport tongue attached to one of said crossmembers, anchoring means whereby said wheels remain aligned in the direction intended for work and when turning said wheel supports by 90 degrees of an angle, anchoring means whereby said wheels remain aligned in the direction intended for transport.

2. The self-trailering grain bagging machine on four wheels of claim 1 wherein on the inner face of said frame are arranged a pair of hydraulic actuator assemblies comprising hydraulic piston rods and accompanying foot supports.

3. The self-trailering grain bagging machine on four wheels of claim 1 wherein all said wheels are equipped with disc brakes.

4. The self-trailering grain bagging machine on four wheels of claim 1 wherein said crossmember to which is attached said transport tongue is finally supported by said wheels that align angularly with said transport tongue.

5. The self-trailering grain bagging machine on four wheels of claim 1 wherein each of said crossmembers comprises, at its extremities, bushings buttressed by reinforcing brackets that project above the box structure of said crossmember.

6. The self-trailering grain bagging machine on four wheels of claim 1 wherein each of said wheels is mounted on one of said wheel supports comprising a vertical shaft, a bearing housing at said vertical shaft's base, and a thrust bearing confined in said bearing housing whereby said vertical shaft can rotate.

7. The self-trailering grain bagging machine on four wheels of claim 1 wherein each of said wheel supports comprises a vertical plate with a wheel spindle affixed to it on which are installed a wheel hub and disc brakes.

8. The self-trailering grain bagging machine on four wheels of claim 6 wherein said vertical shafts of said wheel supports are inserted in said bushings of said crossmembers, and spacers are installed enfolding said vertical shafts whereby they can support said crossmembers.

9. The self-trailering grain bagging machine on four wheels of claim 6, wherein said spacers are arranged enfolding a lower section of said vertical shafts below said crossmembers, whereby said crossmembers are configured for transport mode.

10. The self-trailering grain bagging machine on four wheels of claim 6, wherein said spacers are arranged enfolding a higher section of said vertical shafts, whereby crossmembers are disposed in work position.

11. The self-trailering grain bagging machine on four wheels of claim 1, wherein each said wheel support comprises an anchoring means which fixes said wheel support in transport position.

12. The self-trailering grain bagging machine on four wheels of claim 1, wherein each said wheel support comprises an anchoring means which fixes said wheel support in work position.

13. The self-trailering grain bagging machine on four wheels of claim 1, wherein said transport tongue pivots around a horizontal hitch pin set on a tongue hitch that pivots around a vertical hitch pin.

14. The self-trailering grain bagging machine on four wheels of claim 1, wherein two steering rods connect to a steering rod coupling mounted on said tongue hitch whereby synchronous turning capability is provided to said wheels.

15. The self-trailering grain bagging machine on four wheels of claim 1, wherein from one of said crossmembers projects a rotating hydraulic crane to which is attached a hoist cable from which hangs a bag cradle disposed on said tunnel.

16. The self-trailering grain bagging machine on four wheels of claim 15, wherein straps attach to the extremities of said bag cradle and from said straps is suspended a detachable bag tray that adjoins the bottom section of said tunnel.

17. The self-trailering grain bagging machine on four wheels of claim 15, wherein said bag cradle comprises a cradle hoist bracket to which attaches said hoist cable and further comprises a pair of hinge assemblies that define a central section and two adjacent lateral sections from which hang said straps.

18. The self-trailering grain bagging machine on four wheels of claim 15, wherein said bag cradle comprises leg extensions that support said bag cradle atop upper section of said tunnel to provide a certain clearance between said bag cradle and said tunnel.

19. The self-trailering grain bagging machine on four wheels of claim 16, wherein said detachable bag tray comprises tray handles whereby operators can maneuver said detachable bag tray.

20. The self-trailering grain bagging machine on four wheels of claim 16, wherein both sides of said detachable bag tray comprise horizontally aligned retaining bars whereby said detachable bag tray is held aloft in the air, suspended from said silo bag in its initial folded configuration when said silo bag is tucked under said retaining bars.

21. The self-trailering grain bagging machine on four wheels of claim 20, wherein each of said retaining bars, in the shape of a letter "L", comprises a vertical section of pipe solidly attached to the base of bag tray by means that enable the rotation of said vertical section of pipe, and a horizontal section of pipe conjoined to said vertical section of pipe, said horizontal section of pipe equipped with rings to which said straps outfitted with hooking means can attach to.

22. The self-trailering grain bagging machine on four wheels of claim 16, wherein said detachable bag tray comprises a backboard installed lengthwise to help keep said silo bag appropriately folded on said bag tray.

* * * * *